(12) United States Patent
Goli et al.

(10) Patent No.: US 8,467,316 B1
(45) Date of Patent: Jun. 18, 2013

(54) ENHANCED ADDRESS LEARNING IN LAYER TWO COMPUTER NETWORKS

(75) Inventors: Sri Goli, San Jose, CA (US); Ramasamy Ramanathan, Santa Clara, CA (US); Ramanarayanan Ramakrishnan, San Jose, CA (US); Sanjiv Doshi, San Jose, CA (US); Deepak Ojha, Bangalore (IN); Jagadish Grandhi, Mountain View, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 187 days.

(21) Appl. No.: 12/980,731

(22) Filed: Dec. 29, 2010

(51) Int. Cl.
*H04L 12/28* (2006.01)

(52) U.S. Cl.
USPC .......................... 370/256; 370/254; 370/255

(58) Field of Classification Search
USPC ................. 370/254, 255, 256, 401, 402, 408, 370/249, 216, 241, 242, 252, 244; 709/238, 709/239
See application file for complete search history.

(56) References Cited

U.S. PATENT DOCUMENTS

| | | | |
|---|---|---|---|
| 6,625,124 B1 * | 9/2003 | Fan et al. ........................ | 370/235 |
| 7,379,429 B1 * | 5/2008 | Thottakkara ................... | 370/256 |
| 7,502,376 B2 * | 3/2009 | Vereecke et al. .............. | 370/408 |
| 7,720,011 B1 * | 5/2010 | Thottakkara ................... | 370/256 |
| RE42,253 E  * | 3/2011 | Thottakkara ................... | 370/256 |
| RE43,270 E  * | 3/2012 | Thottakkara ................... | 370/256 |
| 8,139,510 B2 * | 3/2012 | Thottakkara ................... | 370/256 |
| 2006/0098581 A1 * | 5/2006 | Kenghe ......................... | 370/252 |
| 2007/0263554 A1 * | 11/2007 | Finn ............................... | 370/256 |
| 2008/0031154 A1 * | 2/2008 | Niazi et al. .................... | 370/254 |
| 2009/0141622 A1 | 6/2009 | Bitar | |
| 2009/0274155 A1 * | 11/2009 | Nakash ..................... | 370/395.53 |
| 2010/0039934 A1 | 2/2010 | McGuire et al. | |
| 2010/0039961 A1 * | 2/2010 | Tallet et al. ................... | 370/256 |
| 2010/0195661 A1 * | 8/2010 | Thottakkara .................. | 370/401 |
| 2011/0134793 A1 * | 6/2011 | Elsen et al. ................... | 370/254 |
| 2011/0292833 A1 * | 12/2011 | Kapitany et al. .............. | 370/254 |
| 2012/0027017 A1 * | 2/2012 | Rai et al. ....................... | 370/392 |
| 2012/0106321 A1 | 5/2012 | Alon et al. | |
| 2012/0113871 A1 * | 5/2012 | Bulusu .......................... | 370/256 |

OTHER PUBLICATIONS

Office Action from U.S. Appl. No. 12/827,464, dated Jun. 28, 2012, 11 pp.
Bottorff, "MEF Technical Activities," PPT PowerPoint presentation, Metro Ethernet Forum, IEEE, Mar. 12, 2003, 33 pp.

(Continued)

*Primary Examiner* — Chuong T Ho
(74) *Attorney, Agent, or Firm* — Shumaker & Sieffert, P.A.

(57) ABSTRACT

In general, techniques are described for enhanced learning in layer two (L2) networks. A first network device of the intermediate network comprising a control unit and an interface may implement these techniques. The control unit executes a loop-prevention protocol (LPP) that determines a bridge identifier associated with a second network device of the intermediate network, where the first and second network devices each couple to a first network. The LPP selects the second network device as a root bridge and detects a topology change that splits the first network into sub-networks. The interface then outputs a message to direct remaining network devices of the intermediate network to clear L2 address information learned when forwarding L2 communications. The message includes the bridge identifier determined by the loop-prevention protocol as the root bridge and directs these remaining network devices to clear only the L2 addresses learned from this bridge identifier.

28 Claims, 4 Drawing Sheets

OTHER PUBLICATIONS

Bottorff et al., "Carrier Scale Ethernet: Scaling Provider Ethernet," IEEE Communications Magazine, Sep. 2008, pp. 104-109.
IEEE P802.1ah-2008, "Standard for Local and Metropolitan Area Networks—Virtual Bridged Local Area Networks—Amendment 6: Provider Backbone Bridges," Mar. 26, 2008, 116 pp.
"Metro Ethernet," Wikipedia, last updated Sep. 17, 2010, 6 pp., http://en.wikipedia.org/wiki/Metro_Ethernet.
Sultan, Huawei Technologies, Inc., "PBBN in the Data Center," presented at the IEEE 802.1 Interim Meeting, Pittsburgh, PA, May 18-21, 2009, 3 pp.
U.S. Appl. No. 12/771,451, by Sanjiv Doshi, filed Apr. 30, 2010.
U.S. Appl. No. 12/901,985, by Krishna Sankaran, filed Oct. 11, 2010.
U.S. Appl. No. 12/827,464, by Sanjiv Doshi, filed Jun. 30, 2010.
Barry, "An overview of PBB and PLSB," Lightwave Online, Aug. 19, 2008, 3 pp.
Bryant et al., RFC 3985, "Pseudo Wire Emulation Edge-to-Edge (PWE3) Architecture," Mar. 2005, 40 pp.
Kompella et al., RFC 4761, "Virtual Private LAN Service (VPLS) Using BGP for Auto-Discovery and Signaling," Jan. 2007, 29 pp.
Lasserre et al., RFC 4762, "Virtual Private Lan Service (VPLS) Using Label Distribution Protocol (LDP) Signaling," Jan. 2007, 32 pp.
Andersson et al., RFC 5036, "LDP Specification," Oct. 2007, 136 pp.
IEEE 802.1ag-2007, IEEE Standard for Local and metropolitan area networks-Virtual Bridged Local Area Networks Amendment 5: Connectivity Fault Management, Dec. 17, 2007, 259 pp.
IEEE 802.1D, IEEE Standard for Local and metropolitan area networks, Media Access Control (MAC) Bridges, Jun. 9, 2004, 260 pp.
IEEE 802.1Q, IEEE Standards for Local and metropolitan area networks, Virtual Bridged Local Area Networks, May 7, 2003, 326 pp.
Response to Office Action from U.S. Appl. No. 12/827,464, dated Jun. 28, 2012, filed Sep. 21, 2012, 10 pp.

* cited by examiner

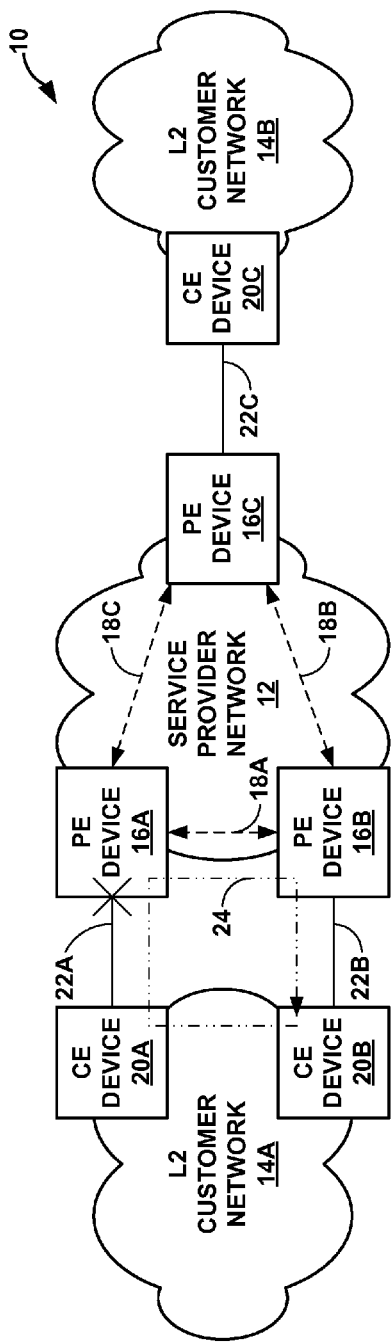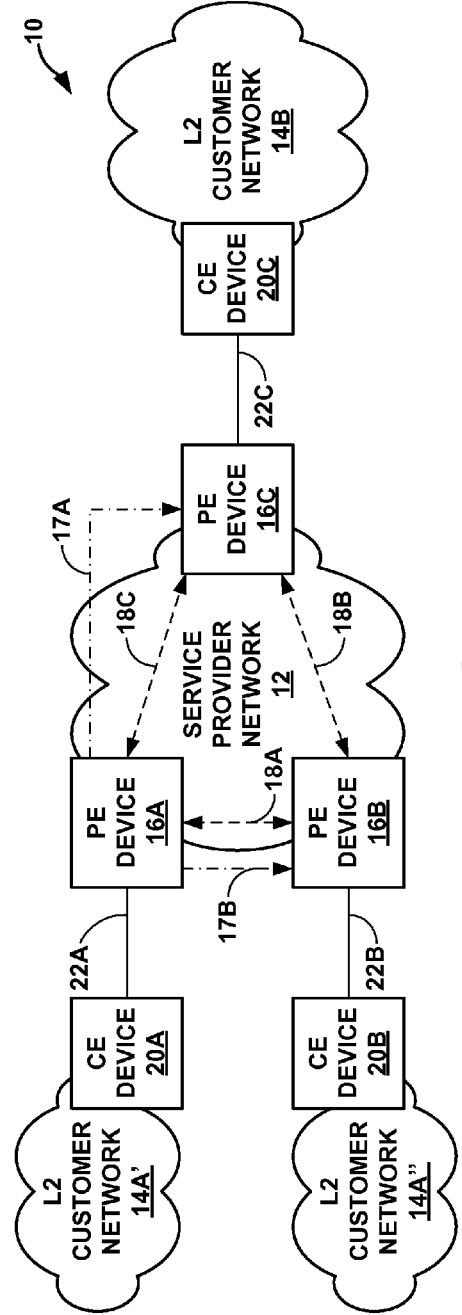
FIG. 1A
FIG. 1B

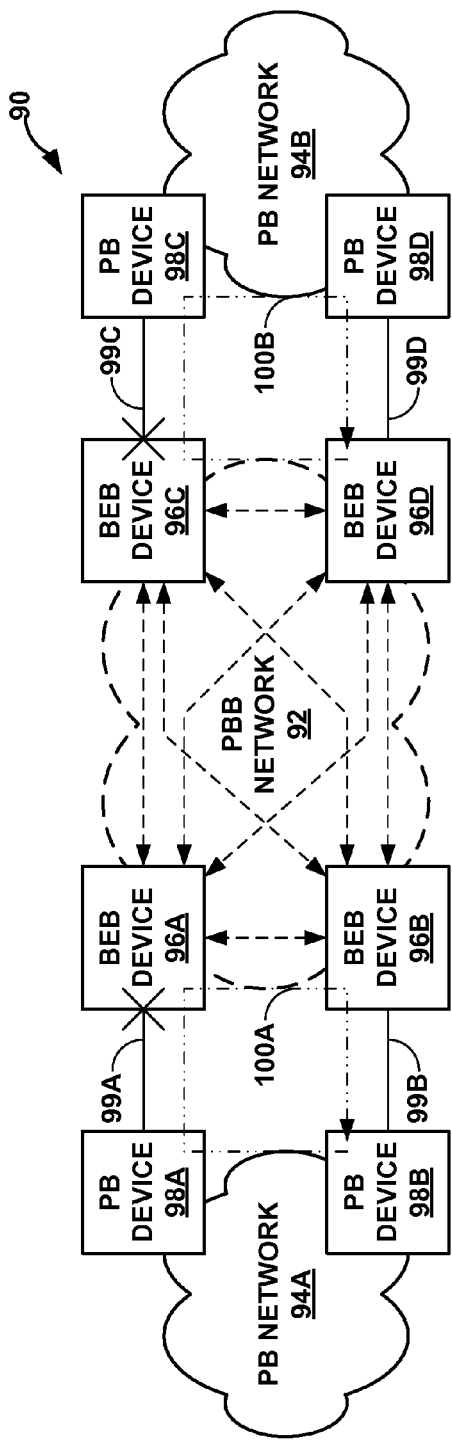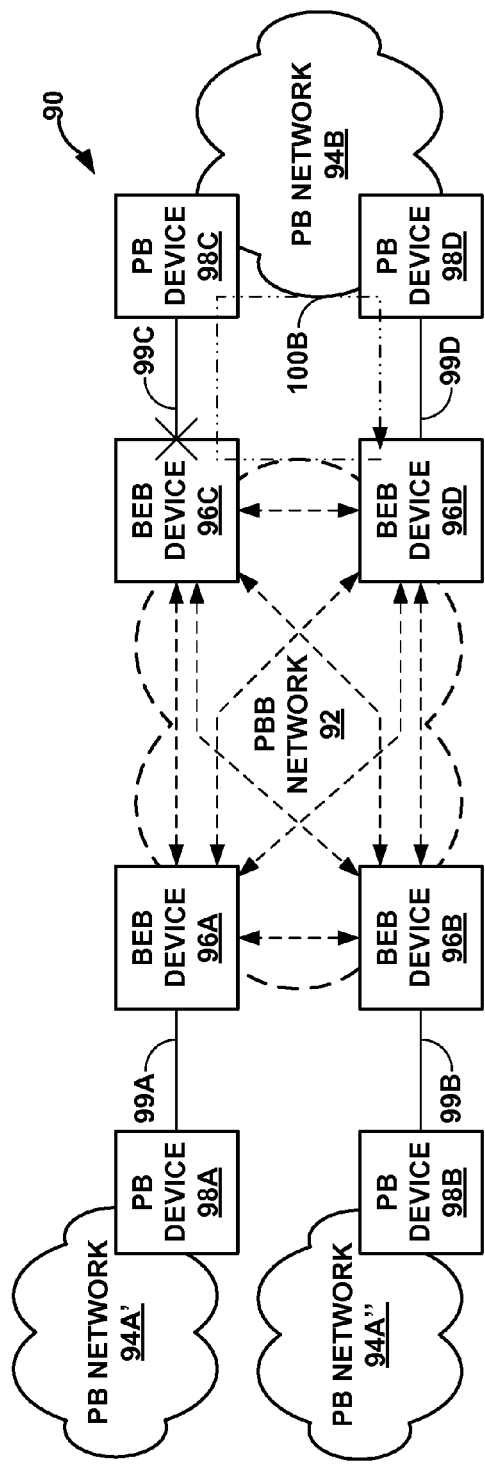

ENHANCED ADDRESS LEARNING IN LAYER TWO COMPUTER NETWORKS

TECHNICAL FIELD

The techniques of this disclosure relate to computer networks and, more particularly, layer 2 (L2) computer networks.

BACKGROUND

Networks that primarily utilize data link layer devices are often referred to as layer two (L2) networks. A data link layer device is a device that operates within the second layer of the Open Systems Interconnection (OSI) reference model, i.e., the data link layer. One example of a common L2 networks is an Ethernet network in which end point devices (e.g., servers, printers, computers) are connected by one or more Ethernet switches. The Ethernet switches forward Ethernet frames, also referred to as L2 communications or L2 packets to devices within the network. As the Ethernet switches forward the Ethernet frames the Ethernet switches learn L2 state information for the L2 network, including media access control (MAC) addressing information for the devices within the network and the physical ports through which the devices are reachable. The Ethernet switches typically store the MAC addressing information in L2 learning tables associated with each of their physical interfaces. When switching an individual Ethernet frame, an Ethernet switches typically broadcasts the Ethernet frame to all of its physical ports unless the Ethernet switch has learned the specific physical port through which to the destination MAC address devices is reachable. In this case, the Ethernet switch forwards a single copy of the Ethernet frame out the associated physical port.

Recently, network service providers have offered systems that provide L2 connectivity between multiple, geographically separate L2 customer networks. That is, the L2 customer networks may be interconnected by the service provider to provide L2 connectivity as if the L2 customer networks were directly connected. One mechanism by which network service providers provide L2 connectivity to their customers is by utilization of Virtual Local Area Networks (VLANs). VLANs are a generic grouping mechanism for Ethernet packets that allow logical isolation of multiple L2 networks that share the same physical Ethernet ports. In other words, a service provider may associate different VLANs with different customers so that L2 traffic and L2 state information for the networks, e.g., MAC addressing information, is logically separate for the customers. VLANs allow network switches and other infrastructure of the service provider to multiplex the L2 customer traffic over shared physical Ethernet ports. In this way, each VLAN provides a connection between devices assigned to the VLAN, and each of the VLANs may essentially be treated as an independent layer two (L2) network. A device assigned to one VLAN can communicate with other devices on that VLAN but may be unable to communicate with devices on a separate VLAN. L2 packets for different VLANs may be correctly forwarded within a network by appending a VLAN tag to the packets to designate the VLAN to which each packet belongs. Each of the various network switches may learn MAC addresses within the context of a VLAN in a manner similar to that described above with respect to the physical Ethernet network so as to switch the L2 traffic throughout the VLAN. If one or more network switches services two or more VLANs, these network switches may learn and store L2 address information for each of the VLANs separately so as to maintain separation between the VLANs.

One type of large area L2 network connectivity being developed is Provider Backbone Bridging (PBB) defined in accordance with IEEE standard 802.1ah. PBB defines an architecture and bridging protocols in which a Provider Backbone Bridged Network (PBBN) provides L2 connectivity between multiple provider bridge networks (PBNs) of one or more different network service providers. Such large area L2 network connectivity is being deployed, for example, in metropolitan area networks. Each PBN provides one or more service VLANs ("S-VLANS) to service and isolate L2 traffic from customer networks. Access switched for the PBBN typically include a set of Backbone Edge Bridges (BEBs) that interconnect some or all of the S-VLANs supported by multiple PBNs. Each BEB provides interfaces that further encapsulate L2 frames for transport through the PBBN. The VLANs used to encapsulate L2 frames from the PBNs and transport the L2 traffic through the PBBN are known as backbone VLANs (B-VLANs), and the resources that support those VLANs are usually considered to be part of the PBBN. In this way, the PBBN may be referred to as a Virtual Bridged Local Area Network under the administrative control of a backbone provider. Further details of PBB can be found in Institute of Electrical and Electronics Engineers, Inc., IEEE P802.1 ah-2008, "Standard for Local and Metropolitan Area Networks—Virtual Bridged Local Area Networks—Amendment 6: Provider Backbone Bridges," hereby incorporated by reference in its entirety.

SUMMARY

In general, the techniques of this disclosure provide for enhanced address learning in layer two (L2) computer networks. More specifically, the techniques may facilitate optimized address learning after a detected failure in a so-called "multi-homed" L2 computer network connected to another L2 computer network via a form of L2 connectivity configured within another computer network, such as a service provider network. A multi-homed customer network refers to a computer network that has two or more customer edge devices, such as L2 switches, that connect the computer network to two or more corresponding provider edge network devices that each provide access to the L2 connectivity provided by the service provider network. When the multi-home customer network experiences an internal failure (e.g., failure of an internal link), the customer network may be split into two sub-networks, each of which utilizes a different one of the customer edge devices to access the service provider network. Before the network failure resulting in the split of the multi-homed computer network, the provider edge network devices dynamically determine (e.g., without human or administrative intervention) which of the provider edge network devices is the root bridge, which represents the device that currently provides access to the L2 connectivity between the multi-homed computer network and the other L2 computer network using a loop-prevention protocol.

After the network failure resulting in the split of the multi-homed computer network, the techniques enable one of the provider edge devices to generate and send a message identifying only those portions of the learned L2 address information that needs to be deleted or flushed and relearned, i.e., the portions associated with the provider edge device that previously dynamically determined to provide the access to the L2 connectivity for the entire multi-home computer network before the network failure. In this sense, the techniques leverage information, i.e., the root bridge, learned via a loop prevention protocol to derive what may be referred to as the multi-home root peer device that previously provided access to the L2 connectivity prior to the network failure. The techniques then enable the one of the provider edge devices to formulate the message to target or otherwise identify those portions of L2 learning information that need to be flushed by specifying the derived multi-homed peer device.

Thus, rather than send a general message that indicates all of the L2 learning information stored by the provider edge devices needs to be flushed, the techniques facilitate automatic generation of an optimized form of this message that identifies only those portions of the L2 learning information that need to be flushed and relearned based on the dynamic determination of which one of the provider edge devices provided the access to the L2 connectivity. Because the determination of the affected portions is dynamic or without human intervention, configuration of such L2 connectivity services, such as a virtual private local area network (LAN) service (VPLS) and a provider backbone bridging (PBB) service, may be simplified. Moreover, this dynamic determination may also reduce or potentially avoid entirely human-related errors that may result in fatal network connectivity issues.

In one embodiment, a method comprises executing a loop-prevention protocol on a first one of a plurality of network devices that provide multi-homed layer two (L2) connectivity between an L2 customer network and an intermediate network, wherein each of the plurality of network devices is coupled to the L2 customer network by a different one of a plurality of links, and wherein the loop-prevention protocol determines a bridge identifier for each of the plurality of network devices and, in accordance with the bridge identifiers, selecting with the loop-prevention protocol a second one of the plurality of network devices as a current root bridge to forward L2 communications between the L2 customer network and the intermediate network without forwarding the L2 communications with other ones of the plurality of network devices. The method also comprises detecting, with the first one of the plurality of network devices, a topology change that splits the L2 customer network into a plurality of L2 sub-networks and, in response to detecting the topology change, outputting a message from the first one of the plurality of network devices to direct the remaining ones of the plurality of network devices to clear L2 address information learned when forwarding the L2 communications, wherein the first one of the plurality of network devices formulates the message to include the bridge identifier determined by the loop-prevention protocol as the current root bridge prior to detecting the topology change to direct the remaining ones of the plurality of network devices to clear only L2 addresses learned from the bridge identifier determined by the loop-prevention protocol as the current root bridge.

In another embodiment, a first network device of a plurality of network devices that provides multi-homed layer two (L2) connectivity between an L2 customer network and an intermediate network, the first network device comprising a control unit that executes a loop-prevention protocol, wherein each of the plurality of network devices is coupled to the L2 customer network by a different one of a plurality of links, and wherein the loop-prevention protocol determines a bridge identifier for each of the plurality of network devices. The loop-prevention protocol selects, in accordance with the bridge identifiers, a second network device of the plurality of network devices as a current root bridge to forward L2 communications between the L2 customer network and the intermediate network without forwarding the L2 communications with other ones of the plurality of network devices and detects a topology change that splits the L2 customer network into a plurality of L2 sub-networks. The first network device also comprising at least one interface that, in response to detecting the topology change, outputs a message to direct the remaining ones of the plurality of network devices to clear L2 address information learned when forwarding the L2 communications, wherein the message includes the bridge identifier determined by the loop-prevention protocol as the current root bridge prior to detecting the topology change to direct the remaining ones of the plurality of network devices to clear only L2 addresses learned from the bridge identifier determined by the loop-prevention protocol as the current root bridge.

In another embodiment, a non-transitory computer-readable medium comprises instructions that, when executed, cause one or more processors to execute a loop-prevention protocol on a first one of a plurality of network devices that provide multi-homed layer two (L2) connectivity between an L2 customer network and an intermediate network, wherein each of the plurality of network devices is coupled to the L2 customer network by a different one of a plurality of links, and wherein the loop-prevention protocol determines a bridge identifier for each of the plurality of network devices, in accordance with the bridge identifiers, select with the loop-prevention protocol a second one of the plurality of network devices as a current root bridge to forward L2 communications between the L2 customer network and the intermediate network without forwarding the L2 communications with other ones of the plurality of network devices, detect, with the first one of the plurality of network devices, a topology change that splits the L2 customer network into a plurality of L2 sub-networks and, in response to detecting the topology change, output a message from the first one of the plurality of network devices to direct the remaining ones of the plurality of network devices to clear L2 address information learned when forwarding the L2 communications, wherein the first one of the plurality of network devices formulates the message to include the bridge identifier determined by the loop-prevention protocol as the current root bridge prior to detecting the topology change to direct the remaining ones of the plurality of network devices to clear only L2 addresses learned from the bridge identifier determined by the loop-prevention protocol as the current root bridge.

In another embodiment, a network system comprises a first L2 customer network that includes first and second customer edge (CE) devices, a second L2 customer network that includes a third customer edge (CE) device and a service provider network positioned intermediate to the first L2 customer network and the second L2 customer network and provides layer two (L2) connectivity in the form of a virtual private local area network (LAN) service (VPLS) between the first L2 customer network and the second L2 customer network to transparently, from the perspective of the first L2 customer network and the second L2 customer network, connect the first and second L2 customer networks to one another. The service provider network includes a first provider edge (PE) device that couples to the first CE device via a first link, a second PE device that couples to the second CE device via a second link, and a third PE device that couples to the third CE device via a third link. The first PE device includes a control unit that executes a loop-prevention protocol, wherein the loop-prevention protocol determines a bridge identifier for each of the first and second PE devices, in accordance with the bridge identifiers, selects with the loop-prevention protocol the second PE device as a current root bridge to forward L2 communications between the first L2 customer network and the service provider network without forwarding the L2 communications with the first PE device, and detects a topology change that splits the first L2 customer network into a plurality of L2 sub-networks. The first PE device also includes at least one interface that, in response to detecting the topology change, outputs a message to direct one or more of the second PE device and the third PE device to clear L2 address information learned when forwarding the L2 communications, wherein the message includes the bridge identifier determined by the loop-prevention protocol as the current root bridge prior to detecting the topology change to direct one or more of the second PE device and the third PE device to clear only L2 addresses learned from the bridge identifier determined by the loop-prevention protocol as the current root bridge.

In another embodiment, a network system comprises a first L2 provider backbone (PB) network that includes first and second PB devices, a second L2 PB network that includes a third and forth PB devices and a provider backbone bridging (PBB) network positioned intermediate to the first L2 PB network and the second L2 PB network and provides layer two (L2) connectivity in the form of a backbone virtual private local area network (LAN) (B-VLAN) between the first L2 PB network and the second L2 PB network to transparently, from the perspective of the first L2 PB network and the second L2 PB network, connect the first and second L2 PB networks to one another. The PBB network includes a backbone edge bridging (BEB) device that couples to the first PB device via a first link, a second BEB device that couples to the second PB device via a second link, and a third BEB device that couples to the third PB device via a third link. The first BEB device includes a control unit that executes a loop-prevention protocol, wherein the loop-prevention protocol determines a bridge identifier for each of the first and second BEB devices, in accordance with the bridge identifiers, selects with the loop-prevention protocol the second BEB device as a current root bridge to forward L2 communications between the first L2 customer network and the service provider network without forwarding the L2 communications with the first BEB device, and detects a topology change that splits the first L2 customer network into a plurality of L2 sub-networks. The first BEB device also includes at least one interface that, in response to detecting the topology change, outputs a message to direct one or more of the second BEB device and the third BEB device to clear L2 address information learned when forwarding the L2 communications, wherein the message includes the bridge identifier determined by the loop-prevention protocol as the current root bridge prior to detecting the topology change to direct one or more of the second BEB device and the third BEB device to clear only L2 addresses learned from the bridge identifier determined by the loop-prevention protocol as the current root bridge.

In another embodiment, a network system comprises a first L2 provider backbone (PB) network that includes first and second PB devices, a second L2 PB network that includes a third and forth PB devices and a provider backbone bridging (PBB) network positioned intermediate to the first L2 PB network and the second L2 PB network and provides layer two (L2) connectivity in the form of a backbone virtual private local area network (LAN) (B-VLAN) between the first L2 PB network and the second L2 PB network to transparently, from the perspective of the first L2 PB network and the second L2 PB network, connect the first and second L2 PB networks to one another. The PBB network includes a backbone edge bridging (BEB) device that couples to the first PB device via a first link, a second BEB device that couples to the second PB device via a second link, and a third BEB device that couples to the third PB device via a third link. The first BEB device includes a control unit that executes a loop-prevention protocol, wherein the loop-prevention protocol determines a bridge identifier for each of the first and second BEB devices and, in accordance with the bridge identifiers, selects with the loop-prevention protocol the second BEB device as a current root bridge to forward L2 communications between the first L2 PB network and the PBB network without forwarding the L2 communications with the first BEB device. The first BEB device also includes at least one interface that receives network traffic via the B-VLAN having a virtual L2 source address associated with the second BEB device and receives network traffic via the B-VLAN having a virtual L2 source address associated with the third BEB device, wherein the control unit stores data associating the virtual L2 source address associated with the third BEB device rather than store the virtual L2 source address associated with the second BEB device based on bridge identifier associated with the selected current root bridge so as not to improperly determine that the second BEB device is a remote peer.

The details of one or more embodiments of the techniques are set forth in the accompanying drawings and the description below. Other features, objects, and advantages of the techniques will be apparent from the description and drawings, and from the claims.

BRIEF DESCRIPTION OF DRAWINGS

FIGS. 1A and 1B are block diagrams illustrating an example network system that implements the enhanced address learning techniques described in this disclosure.

FIGS. 4A, 4B are block diagram illustrating another exemplary network system that implements various aspects of the techniques described in this disclosure.

DETAILED DESCRIPTION

Figure 2:
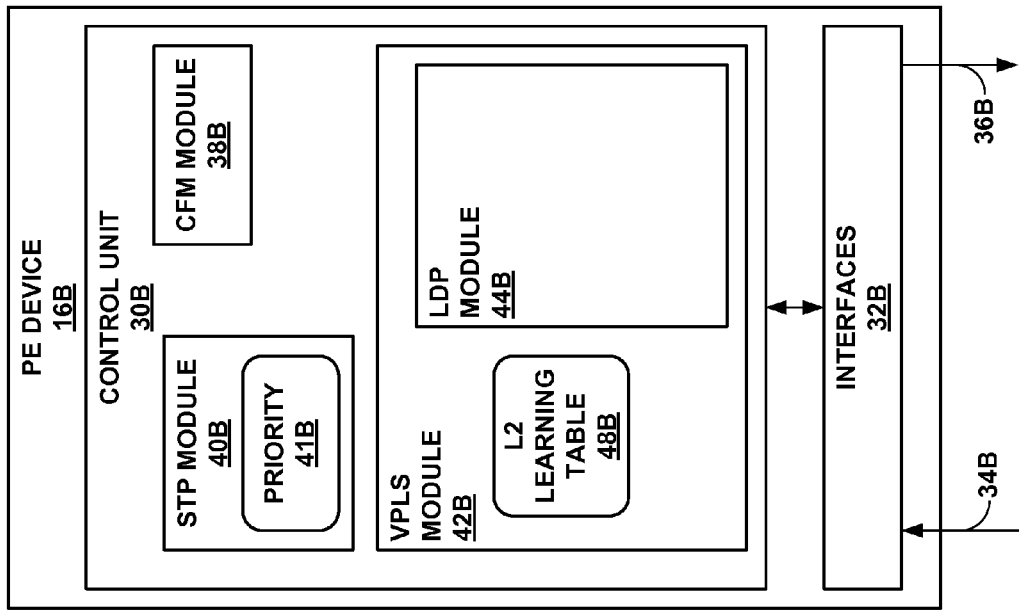
FIG. 2 is a block diagram illustrating the provider edge devices of FIGS. 1A and 1B in more detail.
Figure 2:
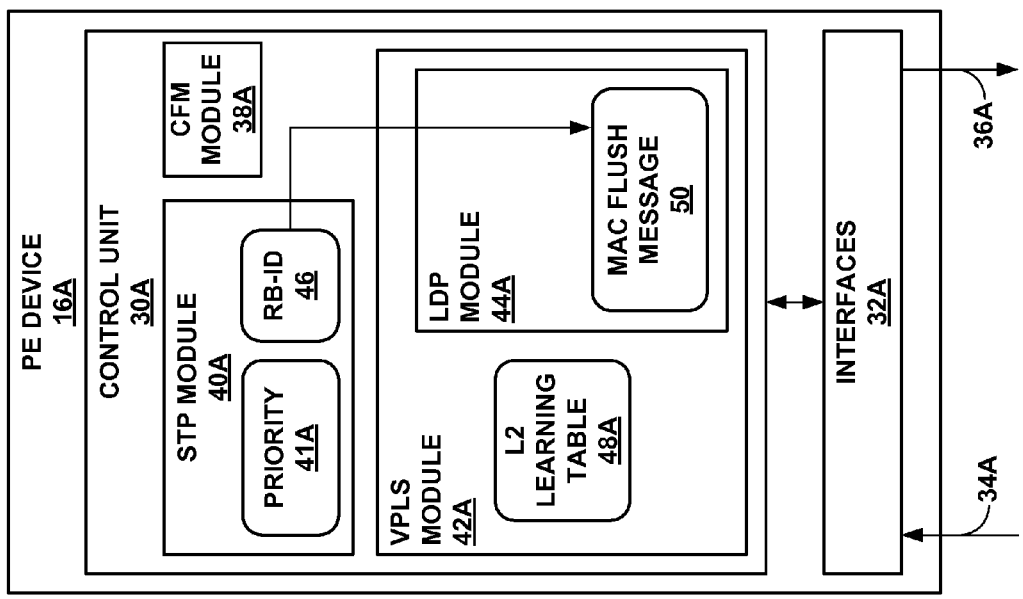

FIGS. 1A and 1B are block diagrams illustrating an example network system 10 that implements the enhanced address learning techniques described in this disclosure. Referring first to FIG. 1A, network system 10 includes an intermediate computer network shown in the example of FIG. 1A as service provider network 12 and two layer two (L2) computer networks shown in the example of FIG. 1A as L2 customer networks 14A, 14B ("L2 customer networks 14").

Service provider network 12 represents a publically accessible computer network that is owned and operated by a service provider, which is usually large telecommunications entity or corporation. Service provider network 12 is usually a large layer three (L3) computer network, where reference to a layer followed by a number refers to a corresponding layer in the Open Systems Interconnection (OSI) model. Service provider network 12 is a L3 network in the sense that it natively supports L3 operations as described in the OSI model, but not layer four (L4) and higher layer operations. Common L3 operations include those performed in accordance with L3 protocols, such as the Internet protocol (IP). L3 is also known as a "network layer" in the OSI model and the term L3 may be used interchangeably with the phrase "network layer" throughout this disclosure.

Service provider network 12 typically provides a number of residential and business services, including residential and business class data services (which are often referred to as "Internet services" in that these data services permit access to the collection of publically accessible networks referred to as the Internet), residential and business class telephone and/or voice services, and residential and business class television services. One such business class data service offered by service provider network 12 includes a virtual private local area network (LAN) service (VPLS). VPLS is a service that provides a form of L2 connectivity across an intermediate network, such as service provider network 12, to interconnect two L2 customer networks, such as L2 customer networks 14, that are usually located in two different geographic areas. Often, VPLS is transparent to the customer networks in that these customer networks are not aware of the intervening intermediate service provider network and instead act and operate as if these two customer networks were directly connected. In a way, VPLS enables a form of transparent LAN connection between two geographically distant customer sites that each operate a L2 network and, for this reason, VPLS is also known as a "transparent LAN service."

In the example of FIG. 1A, L2 customer networks 14 each represent L2 computer networks that subscribe to VPLS offered by service provider network 12. L2 customer networks 14 are considered "L2" in that these customer networks 14 provide native support for L2 operations as described in the OSI model, but do not natively support L3 and higher layer operations. Common L2 operations include those performed in accordance with L2 protocols, such as Ethernet. L2 is also known as a "data link layer" in this OSI model and the term L2 may be used interchangeably with the phrase "data link layer" throughout this disclosure. It is assumed throughout this disclosure for illustrative purposes, that L2 customer networks 14 operate an Ethernet protocol, which utilizes hardware addresses referred to as media access control (MAC) addresses that are typically stored in physical memory residing on interface cards of the customer end-user devices located within L2 customer networks 14.

For purposes of illustration, it is also assumed that a single enterprise owns both of L2 customer networks 14, although this assumption should not limit the techniques described in this disclosure, as any number of entities may own and operate L2 customer networks 14. This single enterprise contracts with the service provider that owns and operates service provider network 14 to subscribe to VPLS. After subscribing to VPLS, service provider network 14 configures service provider network 12 to provide VPLS, which is a form of L2 connectivity, through service provider network 12 so that customer networks 14 transparently interconnect with one another.

To configure VPLS, the service provider configures various devices included within service provider network 12 that interface with L2 customer networks 14. In the example of FIG. 1A, these devices are shown as provider edge (PE) devices 16A-16C ("PE devices 16"). PE devices 16 each represent a L3 network device, such as router, although the techniques are not limited to L3 network devices and may be implemented by any type of network device capable of providing at least one form of L2 connectivity, such as VPLS or the below-described provider backbone bridging (PBB) service. PE devices 16 may generally represent access switches when providing this form of L2 connectivity although PE devices 16 may still comprise L2 network devices that provide L2 access switch functionality so as to properly emulate the L2 form of connectivity. In any event, an administrator, network operator or other user configures each of PE devices 16 to provision what are referred to as "pseudowires" and commonly abbreviated as "PWs." In the example of FIG. 1A, pseudowires are shown as dashed double arrowed lines labeled 18A-18C, over which VPLS operates to enable a logical form of L2 connectivity.

Pseudowires 18A-18C ("pseudowires 18") are logical network connections formed from two unidirectional label switched paths (LSPs) that emulate a connection not natively offered by service provider network 12 for consumption outside the boundaries of that service provider network 12. For example, service provider network 18 may implement a L3 network that internally supports L2 functionality in that it implements L2 functions for use internally within network 12 to support the L3 functions offered externally for consumption by L2 customer networks 14. Pseudowires 18 may emulate a L2 connection within service provider network 14 enabling service provider network 14 to offer emulated L2 connectivity externally for consumption by L2 customer networks 14 as VPLS. More information regarding pseudowires can be found in Request for Comments (RFC) 3985, entitled "Pseudo Wire Emulation Edge-to-Edge (PWE3) Architecture," which is hereby incorporated by reference as if set out in its entirety in this disclosure.

To configure VPLS, pseudowires 18 may be provisioned in a "full-mesh" configuration, meaning that each of the PE devices that provide VPLS for consumption by the subscribing entity is interconnected by way of one of pseudowires 18 to every other one of the PE devices that provide VPLS for consumption by the subscribing entity. In the example of FIG. 1A, each of PE devices 16 provide access to VPLS for consumption by customer networks 14 and, therefore, each of PE devices 16 is connected to every other PE device 16 via one of pseudowires 18. Once pseudowires 18 are configured in this manner, VPLS may be enabled within PE devices 16 to operate over pseudowires 18, which may in this context operate as logical dedicated links through service provider network 12. In operation, VPLS generally involves appending or otherwise inserting a VPLS tag and a pseudowire identifier into incoming L2 packets, which may also be referred to as L2 frames (particularly in the context of Ethernet), and transmitting the tagged packets through a corresponding one of the configured pseudowires, as described in more detail below.

Once VPLS is configured within service provider network 12, L2 customer networks 14 may communicate with one another via VPLS as if they were directly connected L2 networks. Initially, prior to enabling data traffic, L2 customer networks 14 issue control communications to resolve loops and other traffic oddities that may prevent proper communication both within each of and between L2 customer networks 14. As shown in the example of FIG. 1A, each of L2 customer networks 14 include customer edge (CE) devices 20A-20C ("CE devices 20"), with L2 customer network 14A including CE devices 20A and 20B and L2 customer network 14B including CE device 20C.

CE device 20A is coupled to PE device 16A via link 22A, where PE device 16A is capable of providing access to VPLS for L2 customer network 14A via CE device 20A. CE device 20B is coupled to PE device 16B via link 22B, where PE device 16B is capable of providing access to VPLS also for L2 customer network 14A via CE device 20B. In instances where a given network may couple via two different and, to a certain extent, redundant links (in that both links couple the network to a service, such as VPLS), the network may be referred to as being "multi-homed." In this example, L2 customer network 14A represents a L2 multi-homed customer network in that L2 customer network 14A includes two different CE devices 20A, 20B that couple to two different PE devices 16A, 16B via separate and, to a certain extent, redundant links 22A, 22B, where both of PE devices 16A, 16B are capable of providing access to VPLS for L2 customer network 14A.

Multi-homed networks are often employed by network operators so as to improve access to VPLS provided by service provider network 12 should a failure in one of links 22A, 22B occur or should an error occur in L2 customer network 14A, as will be described in more detail below. CE device 20C couples to PE device 16C via link 22C, where PE device 16C provides access to VPLS for L2 customer network 14B via CE device 20C. L2 customer network 14B represents what may be referred to as a "single-homed" network in that it does not feature different and, to a certain extent, redundant connections to VPLS provided by service provider network 12.

PE devices 16A, 16B are described above as being capable of providing access to VPLS for L2 customer network 14A because, typically, only one of PE devices 16A, 16B provides access to the subscribed-to VPLS provided by service provider network 12. As noted above, L2 customer networks 14 implement a loop-prevention control protocol, such as a spanning tree protocol (STP), so as to resolve loops that may prevent proper or at least inefficient communication both within and between L2 customer network 14. Referring to STP for purposes of illustration, the switches and other L2 network devices responsible for switching network traffic within each of L2 customer networks 14, including CE devices 20 and PE devices 16, implement STP to determine a topology of L2 customer networks 14 and resolve this topology in a loop-free manner.

STP is a data link layer or L2 protocol that specifies various messages, referred to as bridge protocol data units (BPDUs), that the bridges or switches, i.e., CE devices 20 and the VPLS portion of PE devices 16 (where this portion effectively emulate a L2 switch or bridge) in this example, exchange to determine the topology of the customer networks 14. After exchanging this information, the switches and other L2 network devices responsible for switching traffic within each of and between L2 networks 14, including CE devices 20 and PE devices 16, first select a so-called "root bridge" from which to resolve the topology in a loop-free manner and then, after selecting this root bridge, resolve the determined topology in the loop-free manner. In effect, STP considers the various L2 devices as a graph whose nodes are the L2 bridges or switches and the links between these devices as the segments. To break any loops present in the graph, the bridges and/or switches compute a spanning tree from the determined graph in a systematic way such that all of the bridges/switches compute the same spanning tree and thereby resolve the graph in a consistent loop-free manner.

Commonly, separate STP domains are established, one for each of L2 customer networks 14, with the result that each of L2 customer networks 14 select their own root bridge (where the STP domain extends the customer facing portion of PE devices 16 in each instance). PE devices 16 may also form another STP domain to select a root bridge among the service provider-facing portions of PE devices 16 that provide the access to the VPLS executing over PWs 18. Usually, the root bridge is configured by way of a priority value set by an administrator or other network operation that operates each of the STP domains. It is assumed that PE device 16B is the root bridge for the STP domain comprising L2 customer network 14A and the customer-facing portions of PE devices 16A, 16B and that PE device 16A would be the root bridge but for the presence of PE device 16B in the STP domain.

In the example of FIG. 1A, multi-home L2 customer network 14A presents a loop in the topology (which is represented again as a graph in most instances) determined predominantly by STP assuming that CE device 20A couples to CE device 20B either directly or indirectly via other devices not shown in the example of FIG. 1A. PE devices 16A, 16B do not however implement STP over the link connecting these devices 16A, 16B to one another. Instead, the one of PE devices 16A, 16B that is not the root bridge implements what is commonly referred to as root-protect or root-guard to logically block the port that connects the non-root bridge one of devices 16A, 16B to the one of devices 16A, 16B that acts as the root bridge. In this way, PE devices 16A, 16B effectively break the loop, which is illustrated as loop 24 in the example of FIG. 1A. In this way, PE devices 16A, 16B break loop 24, as loops may cause L2 devices to endlessly forward traffic considering that L2 functionality does not provide for any form of what may be characterized as "intelligent" L3 routing. In this example, it is assumed that STP as implemented by CE devices 20A, 20B and PE device 16A implements root protect to logically block the port of PE device 16A that receives traffic from link 22A. This logical blocking operation shown in the example of FIG. 1A by the 'X' on the left side of the box representing PE device 16A.

After resolving the topology within each of the STP domains, L2 customer networks 14 may begin sending and receiving traffic between each other. While sending this network traffic, CE devices 20 and PE devices 16 perform L2 learning, although in slightly different ways, considering that PE devices 16 learn with respect to PWs 18 rather than ports. To illustrate, CE device 20B may receive a L2 packet from an end-user device of L2 customer network 14A (which is not shown for ease of illustration purposes) that is destined for L2 customer network 14B. This L2 packet specifies a source L2 address, such as a source MAC address, and a destination L2 address, such as a destination MAC address, where the source L2 address identifies the end-user device that originated the L2 packet and the destination MAC address identifies the L2 device within L2 customer network 14B.

CE device 20B receives this L2 packet via one of its ports, extracts the source L2 address and performs a lookup using a port identifier identifying the port over which this L2 packet was received in what is referred to as a L2 learning table. That is, each of CE devices 20, PE devices 16, and for that matter, each L2 network device responsible for switching traffic within L2 customer networks 14, store data defining a L2 learning table. These L2 learning tables include an entry for each port and associate the port with one or more L2 addresses. The initial lookup retrieves an entry in this table associated with the determined port identifier identifying the port of CE device 20B over which the L2 packet was received. CE device 20B then analyzes this entry to determine whether the extracted source L2 address has been previously associated with this port, as represented by the retrieved entry. If not yet associated with this port, CE device 20B updates this entry in its L2 learning table to associate this source L2 address with the port.

If already associated with this port or after associating the source L2 address with this port, CE device 20B then parses the received L2 packet to extract the destination MAC address. CE device 20B then uses this destination MAC address to perform a lookup in its L2 learning table to determine a port associated with the destination L2 address. If no port has been previously associated with the destination L2 address, CE device 20B determines that none of the entries store an association between one of its ports and the destination L2 address, whereupon CE device 20B broadcasts this packet via all of its port but the port over which CE device 20B received this packet. If CE device 20B retrieves an entry corresponding to a port that has been previously associated with the destination L2 address, CE device 20B forwards this L2 packet via the identified port, which would invariably include the port connecting CE device 20B to PE device 16B via link 22B. In this manner, CE device 20B performs learning with respect to source L2 addresses to store associations between ports and L2 addresses so as to enable switching within L2 customer network 14A and between L2 customer networks 14.

In contrast, PE device 16B stores associations between both ports and PWs 18A, 18B in that the customer-facing side of PE device 16B interfaces with CE device 20B via one of its ports while the service provider-facing side of PE device 16B interface with PE devices 16A, 16C via PWs 18A, 18B, respectively. Consequently, PE device 16B may learn associations between both ports and L2 addresses and PWs and L2 addresses, rather than only learn associations between ports and L2 addresses as is the case for CE devices 20. Despite this difference, for the most part, learning with respect to PWs is similar to learning with respect to ports and for purposes of this disclosure can be assumed to be the same as learning with respect to ports. In this manner, CE devices 20 and PE devices 16 perform L2 learning so as to enable switching of L2 data traffic in an efficient manner as this learning permits CE devices 20 and PE devices 16 to avoid broadcasting L2 packets (which consumes significant amount of bandwidth in comparison to directly switching packets between a source port and an identified destination port) unless these devices have not previously associated a port with the destination L2 address specified in any given packet.

While switching data traffic in this manner, CE devices 20, PE devices 16 and, for that matter, any other L2 network devices responsible for switching network traffic within each of and between L2 customer networks 14, also implement another control protocol referred to as connectivity fault management (CFM) to detect faults in L2 computer networks 14, including those portions of PE devices 16 that emulate a L2 network device for providing the access to the VPLS. As noted above with respect to STP, this CFM may be implemented with respect to separate domains for each of L2 customer networks 14 (including the customer-facing portions of PE devices 16) and the service provider-facing portions of PE device 16.

To implement CFM, CE devices 20 and PE devices 16 issues a number of messages, referred to as continuity check messages (CCMs), between each other within their respective domains. Failing to receive a CCM in a given amount of time triggers a so-called connectivity fault. In response to a connectivity fault, the one of these L2 network devices that detected the connectivity fault issues an STP message alerting all of the other L2 network devices responsible for switching network traffic within their respective domains of the change in the network topology due to the fault. Each of these devices then update their respective network topologies and resolve this updated network topology to prevent loops and ensure that all portions of the topology are reachable from every other portion to the extent possible. While CCM may be employed in the manner described in this disclosure to detect faults it is not a mandatory aspect of the techniques considering that STP provides for period hello messages, which can be used to detect any link failures and thereby trigger topology changes. Consequently, the techniques should not be limited in this respect and may rely on STP instead of CCM to detect connectivity faults.

To illustrate, refer to FIG. 1B, where it is assumed a fault occurred in L2 customer network 14A that splits customer network 14A into two sub-networks shown in the example of FIG. 1B as L2 customer networks 14A' and 14A". Assuming, CE device 20A detected the fault, CE device 20A sends an STP message updating PE device 16A of the change in the topology due to the fault (it should be noted that the logically blocked port only blocks data traffic and not control traffic such as CCMs), where this message is propagated to all of the other L2 network devices within L2 customer network 14A, including PE device 16B. CE devices 20A, 20B and PE devices 16A, 16B update their respective topologies and resolve these updated network topologies to prevent loops and ensure that all portions of the topology within this STP domain are reachable from every other portion to the extent possible. In this example, each of the L2 devices within this STP domain resolves the updated topology in a manner that enables PE device 16A to provide access to the VPLS provided by service provider network 12 so that L2 customer device 14A' is able to communicate both with L2 customer network 14A" and L2 customer network 14B. This access is enabled without preventing a loop because loop 24 is broken by the connectivity fault that split L2 customer network 14A into sub-networks 14', 14".

This topology change causes additional issues with respect to L2 learning tables stored by each of the L2 devices within virtually joined network L2 customer networks 14, including, again, the portion of PE devices 16 that provide access to the VPLS. This issue arises because the L2 devices of L2 customer network 14A' can no longer communicate with CE device 20B due to the lack of connectivity resulting in the split of L2 customer network 14A. Considering that PE device 16B was the determined "root bridge" for L2 customer network 14A, all traffic between L2 customer networks 14 was switched by PE device 16B prior to the connectivity fault, meaning that PE device 20B associated the port connecting link 22B with CE device 20B with all of the L2 addresses of customer network 14A. Likewise, PE device 16C also associated PW 18B with all of the L2 addresses of customer network 14A prior to the connectivity fault. After the connectivity fault, at least some of these associations are incorrect considering that those end-user devices located in L2 customer network 14A' are no longer sending traffic via CE device 20B but via CE device 20A.

To overcome this issue, PE device 16A, upon receiving the topology change message, may generate what is referred to as a "LDP MAC withdrawal message" that instructs PE devices 16B and PE device 16C to clear their L2 learning tables in their entirety. PE device 16A may also clear its L2 learning table in its entirety. Yet, clearing this table in its entirety is inefficient in that only a portion of the L2 learning table is incorrect, i.e., the portion associated with PE device 16B. The MAC flush message noted above provides a field for identifying portions of the L2 learning table that should be cleared. In some cases, this field may store a statically defined device address or other identifier that an administrator, network operator or other user manually configures so as to facilitate a more targeted MAC flush. However, manually configuring this value presents the possibility of miss-configuration due to human error that can result in significant network issues should the wrong device be configured for the more target MAC flush. In fact, user error in configuring the device identifier to facilitate the more targeted MAC flush may cause VPLS connecting L2 customer networks 14 to fail.

In accordance with the techniques described in this disclosure, PE device 16A dynamically learns that PE device 16B provides the access to VPLS provided by service provider network 12 that logically connects L2 customer networks 14. PE device 16A learns this dynamically (or without human intervention that is prone to user error) that PE device 16B provides the access to VPLS via STP in the example above in that PE device 16B is elected as the so-called "root bridge" for this STP domain. PE device 16A, upon not being elected as the root bridge, stores data indicating that PE device 16B is the root bridge. After detecting the connectivity fault, PE device 16A transmits a MAC flush message 17A to PE device 16C via PW 18C that identifies the previous root bridge, i.e., PE device 16B in this example, and indicates that any L2 address learning information associated with the identified previous root bridge needs to be cleared.

In other words, PE device 16A utilizes a loop-prevention control protocol, such as STP, to determine the root bridge for a multi-homed L2 customer network 14A, which in this example PE device 16A determines that PE device 16B is the so-called current root bridge. PE devices 16A then stores a unique identifier associated with the determined root bridge, which again is a unique identifier identifying PE device 16B in this example. PE device 16A then, in response to detecting a connectivity fault that results in a split of L2 customer network 14A into two sub networks 14A' and 14A", leverages this root bridge information learned via a loop-prevention control protocol, to form the above described targeted MAC flush message in accordance with a different control protocol that provides the form of L2 connectivity for spanning service provider network 12 and interconnecting L2 customer networks 14A and 14B. This different control protocol in the example of FIGS. 1A and 1B is LDP, which provides the form of L2 connectivity referred to as VPLS via PWs 18A-18C. In this respect, the techniques leverages information learned from execution of a loop-prevention protocol to derive the dual- or multi-homed peer PE ID, i.e., the unique identifier identifying peer PE device 16B. The techniques then enable PE device 16A to utilize this derived multi-homed peer PE ID to form a targeted MAC flush message in response to detecting an internal connectivity fault (which may refer to a connectivity fault internal to any given CFM domain).

PE device 16B becomes what can be referred to as the "previous root bridge" because the STP domain splits when the connectivity fault. The STP domain splits such that PE device 16A couples to PE device 16B via a service provider-facing PW, which was not included within the STP domain encompassing L2 customer network 14 and the customer-facing portion of PE devices 16A, 16B. Consequently, the STP domain is split into two sub-domains that mirror the split in L2 customer networks 14 into L2 customer networks 14A' and L2 customer network 14A". In the STP domain that encompasses L2 customer network 14A' and the customer-facing portion of PE device 16A, the customer-facing portion of PE device 16A is elected as the root bridge rendering PE device 16B as the so-called "previous root bridge." PE device 16B remains the root bridge for the second STP sub-domain that encompasses L2 customer network 14A" and the customer-facing portion of PE device 16B. PE device 16A stores this previous root bridge data so that it can communicate this information in MAC flush messages 17A, 17B it sends to PE device 16C and PE device 16B.

In this manner, rather than rely on a manually configured device identifier that is prone to human error, the techniques may enable dynamic configuration of this device identifier. Dynamic configuration of this identifier may greatly reduce the chance for error introduced by manual configuration, which may improve network operation as well as reduce administrative burdens. In a sense, this dynamic configuration of the identifier to facilitate the more targeted form of MAC flush allows for an enhanced form of L2 address learning in that it automates the relearning of L2 address-port/L2 address-PW associations necessary after a connectivity failure or other network fault in certain instances, such as the multi-homed instance.

FIG. 2 is a block diagram illustrating provider edge devices 16A and 16B of FIGS. 1A and 1B in more detail. As described above, PE devices 16A, 16B represent L3 routers that provide access to a form of L2 connectivity referred to as VPLS. While described with respect to such L3 devices, the techniques may be implemented by any type of device at any layer in the OSI model that is capable of providing access to any form of L2 connectivity, such as that provided by VPLS or PBB service.

As shown in the example of FIG. 2, PE devices 16A, 16B each respectively include a control unit 30A, 30B ("control units 30"). Control units 30 may each represent one or more processors (not shown in FIG. 2) that execute software instructions, such as those used to define a software or computer program, stored to a computer-readable storage medium (again, not shown in FIG. 2), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, control units 30 may each represent dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

In L3 routers, control units 30 are commonly each divided into separate planes referred to as a "control plane" and a "data plane," which are not shown in the example of FIG. 2 for ease of illustration purposes. The control planes may provide the routing functionality of these PE devices 16A, 16B. In this respect, the control planes may each represent hardware or a combination of hardware and software of control units 30 that implements routing protocols (not shown in the example FIG. 2) by which routing information (not shown in the example of FIG. 2) may be determined. The routing information may include information defining a topology of service provider network 12. The control planes may resolve the topology defined by the routing information to select or determine one or more routes through service provider network 12. The control planes may then update their respective data planes with these routes, where the data planes each maintains these routes as forwarding information (not shown in the example of FIG. 2). The forwarding or data planes may each represent hardware or a combination of hardware and software of control units 30 that forwards network traffic in accordance with the forwarding information. The techniques are generally implemented in the control planes of control units 30 considering that the techniques involve multiple control plane protocols, such as CFM, STP, VPLS and LDP.

PE devices 16A, 16B also each includes interfaces 32A, 32B that receive and send packet flows or network traffic via inbound network links 34A, 34B ("inbound network links 34") and outbound network links 36A, 36B ("outbound network links 36"), respectively. PE devices 16A, 16B each typically includes a chassis (not shown in the example of FIG. 2) having a number of slots for receiving a set of cards, including interface cards that provide interfaces 32A, 32B. Each card may be inserted into a corresponding slot of a chassis for communicably coupling the card to control units 30 via a bus, backplane, or other electrical communication mechanism. The interface cards are typically coupled to network links 34, 36 via a number of interface ports (not shown), and forward and receive packets and control information from control units 30 via respective paths (which, for ease of illustration purposes, are not explicitly denoted in FIG. 2).

Control units 30 each includes a number of different modules 38A-44A, 38B-44B that may be individually or collectively implemented as software executing on the one or more processors or as dedicated hardware, which in each instance is represented as control units 30 in the example of FIG. 2. Each of connectivity fault management (CFM) modules 38A, 38B represents a module that implements CFM in accordance with the CFM standard. More information regarding CFM can be found in the Institute of Electrical and Electronics Engineers (IEEE) 802.1ag standard, entitled "IEEE Standard for Local and Metropolitan Area Networks—Virtual Bridged Local Area Networks—Amendment 5: Connectivity Fault Management," which is hereby incorporated by reference as if fully set forth in this disclosure. Each of spanning tree protocol (STP) modules 40A, 40B represents a module that implements STP in accordance with STP standard. For more information on the STP standard, see IEEE 802.1D, the IEEE standard which defines STP, the entire content of which is hereby incorporated by reference as if fully set forth in this disclosure.

Each of VPLS modules 42A, 42B represents modules that implement VPLS so as to provide access to emulated L2 connectivity spanning service provider network 12. Each of VPLS modules 42A, 42B includes respective label distribution protocol (LDP) modules 44A, 44B. VPLS may generally be provided using either LDP or another routing protocol referred to as a border gateway protocol (BGP). While described in this disclosure with respect to LDP, the techniques should not be limited to this exemplary implementation but may be performed with respect to VPLS implemented using BGP. More information regarding VPLS implemented using LDP can be found in Request for Comments (RFC) 4762, titled "Virtual Private LAN Service (VPLS) Using Label Distribution Protocol (LDP) Signaling," and dated January 2007, which is hereby incorporated by reference as if fully set forth herein in its entirety. More information regarding VPLS implemented using BGP can be found in RFC 4761, titled "Virtual Private LAN Service (VPLS) Using BGP for Auto-Discovery and Signaling," and dated January 2007, which is hereby incorporated by reference as if fully set forth herein in its entirety. Each of LDP modules 44A, 44B represents a module that implements LDP, as described in RFC 5036, titled "LDP specification," and dated October 2007, which is hereby incorporated by references as if set forth in its entirety herein. LDP modules 44A, 44B may each be adapted in the manner defined in the above incorporated RFC 4762 to signal and thereby establish or configure PWs 18 for use in providing the L2 connectivity across service provider network 12.

Initially, an administrator, network operator or other user interfaces with PE devices 16A, 16B (and 16C, although PE device 16C is not shown in the example of FIG. 2 for ease of illustration purposes) to configure the various operating domains of CFM within CFM modules 38A, 38B. As noted above with respect to the example of FIGS. 1A, 1B, PE devices 16A, 16B may each include separate instances of CFM, one of which may be referred to as customer-facing in that this CFM domain interfaces with L2 customer network 14A and the other of which may be referred to as service provider-facing in that this second CFM domain interfaces with PE devices 16 of service provider network 12. CFM modules 38A, 38B, once configured, implement both of these CFM instances.

The administrator, network operator or other user further configures VPLS modules 42A, 42B to provide PWs 18 so as to provide the full mesh of L2 connectivity between PE devices 16A-16C. After configuring VPLS module sin this manner, LDP modules 44A, 44B may signal PWs 18 so as to configure and thereby establish PWs 18 within service provider network 12. Once defined, PWs 18 may begin carrying L2 traffic received from L2 customer networks 14A.

In accordance with the techniques of this disclosure, STP modules 40A, 40B of PE devices 16A, 16B execute the loop-prevention protocol to cooperatively select one of the devices as a "root bridge" to provide the multi-homed L2 connectivity and one of the devices as a "backup root bridge." In this example, STP modules 40A, 40B select PE device 16B as the so-called root bridge for L2 customer network 14A and PE device 16A as the backup root bridge. The STP standard specifies selection of a root bridge based on a combination of a device-specific unique identifier and a configurable priority number assigned to the devices. During this process, the combination of the unique identifier and a configurable priority number for a given device is referred to as a "bridge identifier" or "bridge ID" for that device. Typically, the device-specific unique identifier is a MAC address assigned to the one of the interfaces connecting PE devices 16A, 16B to L2 customer network 14A. The STP standard procedure for selecting the root bridge first looks to the priority number. The bridge in the STP domain having the lowest priority number is selected as the root bridge. Only if two or more bridges or L2 devices have the same lowest priority number does the procedure for selecting the root bridge evaluate the unique identifier. Consequently, the administrator may configure priority aspect of the bridge ID for PE device 16B as the lowest priority within this STP domain, e.g., 2, and for PE device 16A as any number higher than the lowest priority within this STP domain, e.g., 3, but lower than every other priority aspect of the bridge IDs of other L2 devices participating in the STP domain, e.g., 4, so as to configure PE device 16A as the root bridge and PE device 16B as the back-up root bridge. This configuration is provided so that PE device 16A may act as the root bridge for L2 sub-customer network 14A' should L2 customer network 14 split into the two sub-networks 14A' and 14" as shown in the example of FIG. 1B. In the example of FIG. 2, this priority aspect of the bridge ID is shown as priorities 41A, 41B within respective STP modules 40A, 40B.

After being configured in this manner, STP modules 40A, 40B execute initially to determine a topology of L2 customer network 14A, including the customer-facing portion of PE devices 16A that implements STP module 40A for the benefit of customer network 14A. In determining this topology, STP modules of each of the bridges or other L2 network devices that participate in this STP domain exchange STP topology messages, i.e., the BPDUs referred to above, that provide information with regard to the topology as well as the bridge ID of the bridge sending this information. From this information, each of the STP modules may construct the topology. STP module 40A then determines a root bridge for this STP domain using the bridge IDs specified in the BPDUs, which in this instance is determined to be PE device 16B based on the configuration noted above. In this way, STP module 40A dynamically learns that PE device 16B couples the L2 customer network 14A to L2 customer network 14B via VPLS provided by service provider network 12. After determining that PE device 16A is not the root bridge, STP module 40A resolves the topology, which results in STP module 40A logically blocking one of interfaces 32A by which PE device 16A couples to CE device 20A of L2 customer network 14A so as to prevent loop 24. STP module 40A, after determining that PE device 16B is the root bridge, STP module 40A stores this root bridge-ID (RB-ID) as RB-ID 46 for later use in signaling those portions of the learning information that need to be cleared or flushed in the event of a network fault.

After resolving the topology and preventing any loops, such as loop 24, PE devices 16A, 16B then receive L2 traffic from L2 customer network 14, performing L2 learning as described above to update data defining L2 learning tables 48A, 48B, respectively. Again, VPLS modules 42A, 42B may learn both associations between source MAC addresses specified in the received L2 traffic and interfaces 32A (which may each represent a so-called port) and associations between source MAC addresses and PWs 18 or, more specifically, attachment circuits (ACs) that provide respective interfaces to PWs 18. In this sense, the ACs may represent virtual interfaces or ports to the virtual links referred to as PWs 18.

CFM modules 38A, 38B also execute CFM as defined in the above incorporated reference to detect connectivity faults. Detecting connectivity faults in accordance with CFM involves periodically sending continuity check messages (CCMs), and failure to receive a CCM from an adjacent device within a set amount of time triggers detection of a connectivity fault. The CFM module of the network device that detects this connectivity fault informs its instance of STP, which signals this fault to all other L2 devices that participate in this STP domain as a change in the network. STP provides for a topology change notification (TCN) message to announce changes in the network topology and STP module 40A receives a TCN message from the device that detected the connectivity fault signaling the connectivity fault. STP module 40A updates its topology, effectively determining that L2 customer network 14A has been split into two L2 customer network 14A' and 14A". In this way, STP module 40A detects a change in L2 customer network 14A that splits this network 14A into L2 computer sub-network 14A' and L2 computer sub-network 14A".

Considering that PE device 16A was configured as the backup root bridge, STP module 40A selects PE device 16A as the root bridge for L2 sub-customer network 14A'. That is, PE device 16A has the lowest priority in the new STP domain covering L2 sub-customer network 14A' as PE device 16B is no longer participating in this new STP sub-domain. STP module 40A resolves this topology using PE device 16A as the root bridge so as to prevent loops. STP module 40A determines that the one of interfaces 32A that was previously blocked should be unblocked and logically unblocks this one of interfaces 32A so as to provide L2 sub-customer network 14A' access to VPLS provided by service provider network 12.

STP module 40B also receives this or a similar TCN message form a participate device in the STP domain that resides in L2 sub-customer network 14A". STP module 40B updates its topology in a manner similar to that described above with respect to STP module 40A and arrives at the same determination as that arrived at by STP module 40A, i.e., that L2 customer network 14A has split into two different L2 sub-customer networks 14A', 14A". STP module 40B determines that PE device 16B remains as the root bridge for L2 sub-customer network 14A" and proceeds to resolve the topology to prevent loops. STP module 40A also, in response to detecting the change in L2 customer network 14A, interfaces with LDP module 44A to instruct LDP module 44A to send an enhanced MAC flush message 50 specifying previously stored RB-ID 46. LDP module 44A then generates MAC flush message 50 to identify previously stored RB-ID 46, which in this example identifies PE device 16B by way of the unique ID (i.e., MAC address in this example) portion of RB-ID 46, and indicates that any L2 address learning information associated with this MAC address needs to be cleared. LDP module 44A sends this MAC flush message 50 to VPLS module 42B of PE device 16C.

PE device 16C, which may be substantially similar to PE devices 16A, 16B, receives this MAC flush message 50 and flushes any associations between MAC addresses and those of PWs 18 that couple to the one of interface 32B assigned the signaled MAC address. In other words, VPLS module 42C of PE device 16C updates its L2 learning table 48C to clear all of the associations between PW 18B and source MAC addresses assigned to end-user devices located within L2 customer network 14A, as some of these associations are no longer valid considering that some of these associations identify MAC addresses assigned to end-user devices that reside within L2 customer network 14A' and that are no longer reachable via PE device 16B and PW 18B. VPLS module 42A and 42B also perform a similar flushing to that performed by VPLS module 42C except for this flushing is triggered in response to the detection of the change in network topology rather than a specific MAC flush message.

Thus, rather than send a general MAC flush message or manually configure RB-ID 46 identifying PE device 16B within PE device 16A, the techniques described in this disclosure may enable automatic determination of this RB-ID 46. As networks change and evolve, it is common for configuration information such as this to not be properly updated especially given personnel changes in administrative staff. As a result, changes to the STP domain and particularly the priorities assigned to various network devices that participate in the STP domain may be altered while the corresponding manual configuration of the RB-ID may not be changed to reflect the various reassignments of priorities. This can result in a number of issues that prevent proper network operations. By automating this aspect of the configuration, the techniques avoid configuration inconsistencies that may result in these issues that prevent proper network operation.

After sending MAC flush message 50 and potentially clearing its L2 learning table 48A to remove any associations between RB-ID 46 and PW 18A, interfaces 32A of PE device 16A may receive traffic originating from L2 customer network 14A', L2 customer network 14" and L2 customer network 14B via link 22A, PW 18A and PW 18C respectively. VPLS module 42A may then perform L2 learning in the manner described above to associate various source MAC addresses with the one of interfaces 32A coupled to link 22A and the ACs for PWs 18A, 18C. PE device 16A continues to operate in this manner until the connectivity fault is resolved, whereupon L2 sub-customer networks 14A' and 14A" return to its merged or whole state, i.e., L2 customer network 14A in the example described above.

The techniques described above also apply in this instance where the connectivity fault is resolved. STP module 40A, after interfacing with LDP module 44A to issue targeted MAC flush message 50 that specifies the previously selected root bridge by way of RB-ID 46, updates RB-ID 46 to store the bridge ID identifying in part the MAC address of one of the interfaces of the selected root bridge, i.e., one of interfaces 32A of PE device 16A that couples to link 22A in this example. Upon resolving the connectivity fault, STP module 40A receives a BPDU in the form of a TCN message that indicates a change in the topology. STP module 40A selects the root bridge as PE device 16B considering that priority 41B has been configured to be lower than priority 41A and, in fact, has been configured to be the lowest priority in the STP domain. Consequently, STP module 40A interfaces again with LDP module 44A to instruct LDP module 44A to generate another MAC flush message 50 that specifies updated RB-ID 46 specifying in part the MAC address assigned to the one of the interfaces associated with link 22A. LDP module 44A sends this targeted MAC flush message 50 to other VPLS PE devices 16B, 16C, which causes them to clear all associations between PWs 18A and 18C by which PE devices 16B, 16C connect to PE device 16A.

Again, rather than send a general MAC flush message or manually configure RB-ID 46 identifying PE device 16B within PE device 16A, the techniques described in this disclosure may enable automatic determination of this RB-ID 46. As networks change and evolve, it is common for configuration information such as this to not be properly updated especially given personnel changes in administrative staff. As a result, changes to the STP domain and particularly the priorities assigned to various network devices that participate in the STP domain may be altered while the corresponding manual configuration of the RB-ID may not be changed to reflect the various reassignments of priorities. This can result in a number of issues that prevent proper network operations. Again, by automating this aspect of the configuration, the techniques avoid configuration inconsistencies that may result in these issues that prevent proper network operation.

Figure 3:
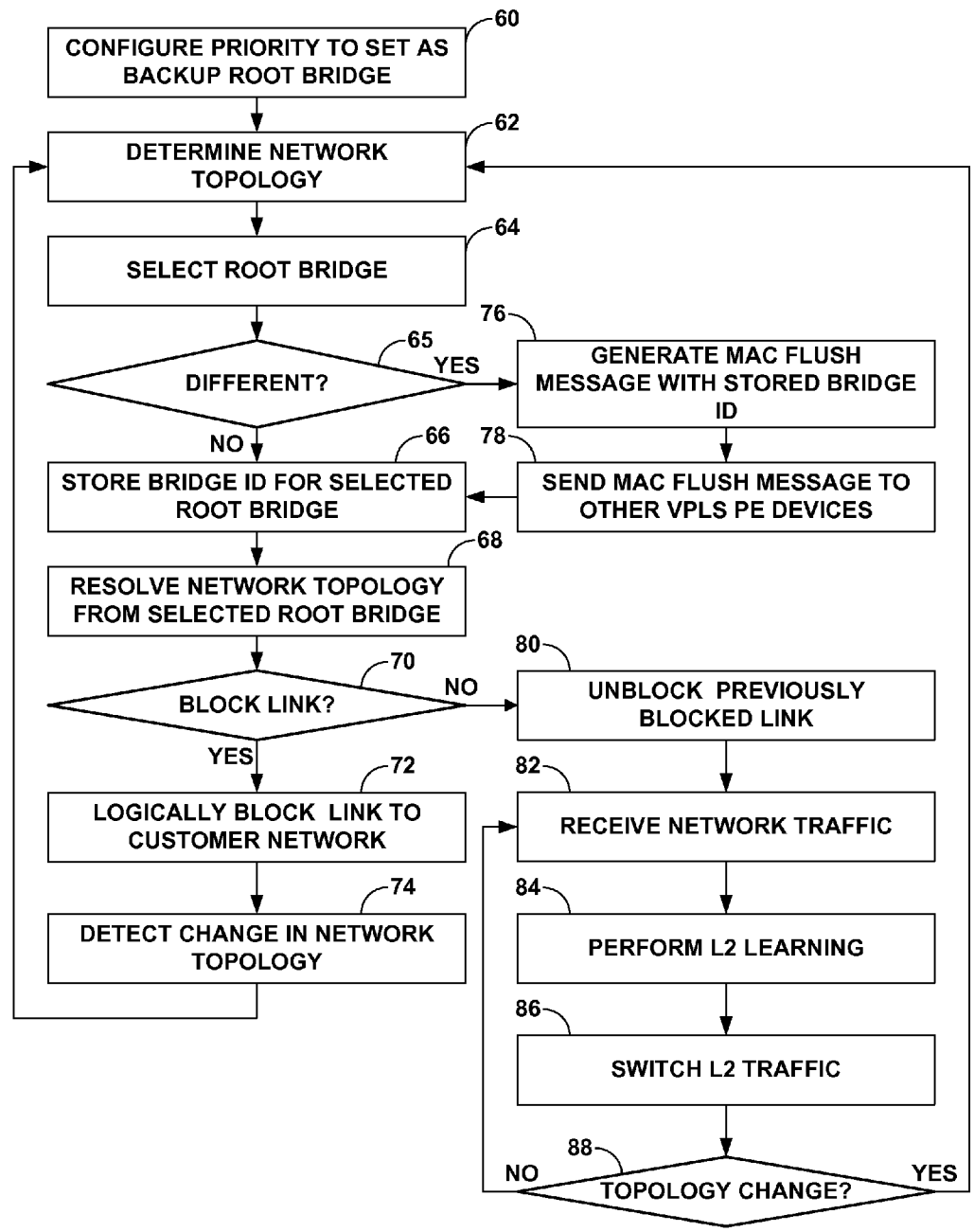
FIG. 3 is a flow chart illustrating example operation of a network device in performing various aspects of the techniques described in this disclosure.

FIG. 3 is a flow chart illustrating example operation of a network device, such as PE device 16A of FIG. 2, in performing various aspects of the techniques described in this disclosure. Initially, as described above, an administrator, network operator or other user configures priority 41A within STP module 40 to set PE device 16A within the STP domain as a backup root bridge (60). After the administrator enables PE device 16A to operate in this STP domain, STP module 40A of PE device 16A begins receiving BPDU's specifying the network topology and, in this way, STP module 40A determines the network topology (62). STP module 40A then selects the root bridge in the manner described above (64). STP module 40A, upon selecting the root bridge, then determines whether the root bridge ID associated with the selected root bridge is different from that stored by STP module 40A (65). Usually, during startup, STP module 40A ignores this comparison as it has not previously stored any value to RB-ID 46, and may determine that it has not stored this value because it is set to a null value. On the initial startup, STP module 40A is configured to assume that this value is not different ("NO" 65). STP module 40A then stores the bridge identifier for the selected root bridge, which is shown in the example of FIG. 2 as RB-ID 46, replacing the null value previously stored as RB-ID 46 (66). STP module 40A then resolves the network topology from the selected root bridge to prevent loops (68).

When resolving the network topology, STP module 40A may determine that there are one or more loops, such as loop 24 shown in the example of FIG. 1A. This loop 24 arises because of the multi-homed nature of L2 customer network 14A. To prevent this loop, STP module 40A determines that link 22A needs to be logically blocked ("YES" 70). The determination of blocking this link over other links, especially link 22B, occurs as a result of configuring PE device 16B to be the root bridge in this STP domain. Blocking link 16B prevents L2 customer network 14A from reaching what every other L2 device that participates in this STP domain considers as its root bridge. According to STP, this is impermissible. Consequently, STP module 40A logically blocks the one of interfaces 32A that couples to link 22A, effectively blocking link 22A to L2 customer network 14A (72). PE device 16A is therefore effectively blocked from receiving communications directly from L2 customer network 14A, however, PE device 16A may still receive traffic originating from L2 customer network 14A via PW 18A and traffic originating from L2 customer network 14B via PW 18C. As a result PE device 16A may still perform L2 learning and store data defining L2 learning table 48A.

At some later point in time, PE device 16A detects a change in the topology, as described above (74). This change is assumed to split L2 customer network 14A into two L2 sub-customer networks 14A' and 14A". STP module 40A determines this assumed change upon updating or otherwise determining the network topology as it exists after the change (62). The network topology, after the change, reflects the split in that STP module 40A only determines the topology for L2 customer network 14A" and does not determine the network topology for L2 sub-customer network 14A". STP module 40A again selects the root bridge (64), only in this instance STP module 40A selects the root bridge as PE device 16A considering that PE device 16A was previously configured as what is referred to herein as the "backup" root bridge. Comparing this current root bridge to that stored as RB-ID 46 to detect whether these are different (65), STP module 40A determines that the currently selected RB-ID is different from that stored currently as RB-ID 46 ("YES" 65). As a result of detecting this difference, STP module 40A interfaces with LDP module 44A, instructing LDP module 44A to generate a targeted MAC flush message with the stored bridge ID, i.e., RB-ID 46 in this example. LDP module 44A generates MAC flush message 50 with RB-ID 46 and sends this MAC flush message to other VPLS PE device 16B, 16C as described above (76, 78).

After instructing LDP module 44A to generate and send MAC flush message 50, STP module 40A stores the currently selected bridge ID identifying PE device 16A as RB-ID 46, replacing the bridge ID identifying PE device 16B previously stored as RB-ID 46 (66). STP module 40A then resolves the network topology with respect to this current root bridge, as described above (68). When resolving this topology, STP module 40A determines whether to block link 22A (70). As a result of the topology change, STP module 40A determines not to block link 22A and logically unblocks this link 22A ("YES" 70, 80). After unblocking this link 22A, interfaces 32A may begin receiving network traffic in the manner described above (82).

Again, as described above, VPLS module 402A then performs L2 learning to maintain or otherwise update L2 learning table 48A to facilitate proper L2 switching and switches the received L2 traffic in accordance with L2 learning table 48A (84, 86). Switching the L2 traffic may involve VPLS module 42A encapsulating the packets with a VLAN tag and a PW tag to traverse the PW 18C connecting PE device 16 and PE device 16C so that the L2 traffic may be forwarded to L2 customer network 14B.

STP module 40A may at some later point receive a TCN message indicating a network topology change. Until that time, PE device 16A continues to act as the root bridge for L2 sub-customer network 14A', receive network traffic, perform L2 learning and switch the received L2 traffic ("NO" 88, 82-86). Upon receiving a TCN message indicating that the connectivity fault has been resolved, STP module 40A updates the topology to reflect the joining of L2 sub-customer networks 14A', 14A" to reform L2 customer network 14A, determines a root bridge for L2 customer network 14A and determines whether this current root bridge is different from that stored as RB-ID 46 (62-65).

In this instance, the current root bridge is different from that stored as RB-ID 46 ("YES" 65) and STP module 40A once again interfaces with LDP module 44A to cause that module to generate and send MAC flush message 50 identifying the previous root bridge, i.e., RB-ID 46 (76, 78). STP module 40A then stores the bridge ID of the current root bridge as RB-ID 46, resolves the network topology and as a result, logically re-blocks link 22A to prevent loop 24 (66, 68, "YES" 70, 72). In this manner, PE device 16A may implement the techniques described in this disclosure to automate, as described above, the generation of targeted MAC flush messages by leveraging STP and its ability to configure a priority to define a root bridge and a backup root bridge as well as its ability to automatically determine the root bridge in any STP domain.

FIGS. 4A, 4B are block diagram illustrating another exemplary network system 90 that implements various aspects of the techniques described in this disclosure. As shown in the example of FIG. 4A, network system 90 includes a provider backbone bridging (PBB) network 92 ("PBB network 92") provides a PBB service. Again, more information regarding PBB can be found in the above incorporated IEEE P802.1ah-2008, titled "Standard for Local and Metropolitan Area Networks—Virtual Bridged Local Area Networks—Amendment 6: Provider Backbone Bridges." Regardless, PBB involves implementing a form of VLAN similar to that described above that is referred to as a backbone-VLAN or B-VLAN. PBB network 92 may support one or more Ethernet line ("E-line") services, such as a dedicated E-Line service, an Ethernet LAN (E-LAN) service, and an Ethernet tree (E-tree) service, for consumption by Provider Backbone (PB) networks 94A, 94B, also included within network system 90. PBB network 90 includes a number of backbone edge bridging (BEB) devices 96A-96D that couple to provider bridge (PB) devices 94A-94D, which are included in PB networks 94A, 94B, respectively and couple to BEB devices 96A-96D via links 99A-99D. PBB network 92 generally provides protected service-tagged or S-tagged interfaces to PB networks 94A, 94B.

As shown in the example of FIG. 4A, PB networks 94A, 94B may be considered "multi-homed" in that both of PB networks 94A, 94B include respective PB devices 98A, 98B and 98C, 98D that couple to BEB devices 96A, 96B and 96C, 96D via links 99A, 99B and 99C, 99D. BEB devices 96A-96D are also configured to interconnect with one another in a full-mesh configuration which is shown by dashed lines in the example of FIG. 1A. Similar to network system 10 shown in the example of FIG. 1A where multi-homed customer network 14A introduces loop 24, these multi-homed networks generally introduce loops 100A, 100B.

To prevent these loops, BEB devices 96A-96D and PB devices 98A-98D, as well as, all of the other participating L2 bridges implement a protocol similar to STP to prevent loops 100A, 100B. This protocol similar to STP is referred to as multiple spanning tree protocol (MSTP). More information concerning MSTP can be found in IEEE 802.1Q-2003, which is hereby incorporated by reference as if fully set forth in this disclosure. MSTP is a form of STP that is optimized for execution in instances where multiple VLANs execute over the same network, which is the case when providing PBB services.

In accordance with the techniques described in this disclosure, BEB device 96A may implement MSTP to learn of a connectivity fault that splits PB network 94A into at least two PB sub-networks, which are shown in the example of FIG. 4B as PB network 94A' and 94A". MSTP then functions in a manner substantially similar to STP described above only with respect to a different signaling protocol referred to as a Multiple I-SID Registration Protocol (MIRP). MIRP provides for a MAC flush message that can be, like the MAC flush message in LDP, general in scope or targeted. Consequently, the techniques described above may be applied in this context to facilitate transmission of a targeted MIRP MAC flush message that specifies the previously stored RB-ID, as stored by PE device 96A. More information regarding MIRP can be found in draft IEEE 802.1Qbe standard, titled "Multiple I-SID Registration Protocol," which is hereby incorporated by reference as if fully set forth in its entirety.

Receipt of these MIRP MAC flush message causes BEB devices 96B-96D to clear any L2 learning information associated with the identified root bridge identifier. In PBB network 92, L2 learning information associates customer-MAC (C-MAC) entries with I-SIDs, where I-SIDs are associated with virtual LAN (VLAN) IDs used for providing the PBB service. BEB devices 96B-96D may use this signaled previous root bridge identifier to only flush or clear those C-MAC entries associated with BEB device 96B. Once these entries are cleared, BEB devices 96B-96D may then relearn the L2 learning information given the new topology shown in the example of FIG. 4A. Again, at some point the connectivity fault may be corrected, resulting in a transmission of the MIRP MAC flush message only this MIRP MAC flush message specifies BEB device 96A as the device from which to base the flushing of C-MAC entries.

While the techniques of this disclosure have been described above with respect to a certain type of multi-homed network, i.e., one that includes two or more PB devices that connects to two or more BEB devices via different links, multi-homed networks may also include one in which only a single PB device couples to two or more BEB devices via two separate links. The techniques may also be implemented in this instance to facilitate targeted flushing of L2 learning information and the techniques should not be limited to the example provided by way of FIGS. 4A, 4B.

The techniques described in this disclosure may also be extended to other contexts, such as protected E-line service in a PBB network. In this context, when an E-line service is provisioned between two dual-homed customer sites over a PBB network, similar to that shown in FIGS. 4A, 4B, the point-to-point E-line service is typically provisioned to use a single Backbone VLAN (B-VLAN or BVLAN) spanning across all of the PE devices, which in this context may be refer to BEB devices similar to BEB devices 96. In this case, the BEB devices use a virtual source MAC address to send the traffic over the PBB network via the BVLAN, where this virtual source MAC address represents a MAC address associated with the E-line service. Considering that all of the BEB devices participate in the same BVLAN, these BEB devices may learn of the virtual MAC address of the local peer and wrongly construe it as a remote peer, where BEB devices 96C and 96D are local peers to one another and BEB devices 96A and 96B are local peers to one another and BEB devices 96C, 96D are remote peers to BEB devices 96A, 96B. In the event of this learning issue, the BEB devices that misconstrued the local peer as the remote peer will wrongly send the E-line service traffic to the local peer using the virtual MAC address, effectively causing the traffic to be redirected back to the same PB network.

To illustrate, consider that BEB devices 96B and 96D are configured as the root bridge devices for their respective PB networks 94A, 94B as shown in the example of FIG. 4A. BEB device 96B may receive traffic that is to be sent over the point-to-point E-line service to PB network 94B but not initially know to which of its remote peers, i.e., BEB devices 96C, 96D, to send this E-line service traffic. In this instance, BEB device 96B forwards the E-line service traffic to each of BEB devices 96A, 96C and 96D via the BVLAN using the virtual MAC address associated with the E-line service as the source address for this E-line service traffic. BEB device 96D may respond to this traffic at some later point or transmit different traffic such that BEB device 96B learns that BEB device 96D is the proper remote peer to which the E-line service has been provisioned.

However, BEB device 96A receives this initial traffic sent by BEB device 96B and may associate this traffic with the E-line service wrongly construing BEB device 96B as a remote peer, i.e., as one of BEB devices 96C and 96D in this example, when in fact BEB device 96B is a local peer. This misconstruction can result in BEB device 96A in sending traffic to its local peer BEB device 96B under the incorrect assumption that BEB device 96B is a remote peer coupled to PB network 94B. The techniques may overcome this issue by enabling the BEB devices to maintain the peer-ID derived from the previous root bridge ID so as to identify the local BEB devices. Using this previous root bridge information enabled by the techniques described in this disclosure, the BEB devices may ignore the virtual MAC address learned from their local peers. In the example above, BEB device 96A may ignore the virtual MAC address learned from local peer BEB device 96B. In this respect, the techniques may facilitate proper learning of virtual MAC addresses in the point-to-point E-line service context so as to potentially prevent directing traffic to a misconstrued remote peer, which may result in traffic being dropped by BEB device 96B.

Commonly, BEB device 96A may receive this traffic during a connectivity fault that results in BEB device 96A becoming a root bridge for PB network 94A'. BEB device 96A would, absent the techniques described in this disclosure, attempt to send traffic destined to PB network 94B to BEB device 96B using the virtual MAC address learned from the initial transmission of traffic sent by BEB device 96B. BEB device 96B would drop this traffic, which would effectively prevent BEB device 96A from being able to send traffic to PB network 94B. Instead, in accordance with the techniques described in this disclosure, BEB device 96A ignores this initial virtual MAC address broadcast by its local peer as determined based on the previous root bridge information and only learns the virtual MAC address associated with BEB device 96D. In this way, the techniques may facilitate proper learning of virtual MAC addresses in the point-to-point E-line service context so as to potentially prevent directing traffic to a misconstrued remote peer, which may result in traffic being dropped by BEB device 96B.

Various embodiments of the invention have been described. These and other embodiments are within the scope of the following claims.

The invention claimed is:

1. A method comprising:
    executing a loop-prevention protocol on a first one of a plurality of network devices that provide multi-homed layer two (L2) connectivity between an L2 customer network and an intermediate network, wherein each of the plurality of network devices is coupled to the L2 customer network by a different one of a plurality of links, and wherein the loop-prevention protocol determines a bridge identifier for each of the plurality of network devices;
    in accordance with the bridge identifiers, selecting with the loop-prevention protocol a second one of the plurality of network devices as a current root bridge to forward L2 communications between the L2 customer network and the intermediate network without forwarding the L2 communications with other ones of the plurality of network devices;
    detecting, with the first one of the plurality of network devices, a topology change that splits the L2 customer network into a plurality of L2 sub-networks; and
    in response to detecting the topology change, outputting a message from the first one of the plurality of network devices to direct the remaining ones of the plurality of network devices to clear L2 address information learned when forwarding the L2 communications, wherein the first one of the plurality of network devices formulates the message to include the bridge identifier determined by the loop-prevention protocol as the current root bridge prior to detecting the topology change to direct the remaining ones of the plurality of network devices to clear only L2 addresses learned from the bridge identifier determined by the loop-prevention protocol as the current root bridge.

2. The method of claim 1, further comprising:
    configuring the first one of the plurality of network devices to be a backup root bridge to the second one of the plurality of network devices with respect to the loop-prevention protocol,
    wherein detecting the topology change that splits the L2 customer network comprises detecting a topology change that splits the L2 customer network into a first L2 sub-network network to which the first one of the plurality of network devices couples via a first one of the plurality of links and a second L2 sub-network to which the second one of the plurality of network devices couples via a second one of the plurality of links; and
    after detecting the topology change, selecting with the loop-prevention protocol executed by the first one of the plurality of network devices the first one of the plurality of network devices as the current root bridge given that the second one of the plurality of network devices no longer participates in the loop-prevention protocol due to the topology change.

3. The method of claim 1,
    wherein the loop-prevention protocol comprises a spanning tree protocol (STP) or a multiple spanning tree protocol (MSTP),
    wherein selecting with the loop-prevention protocol the second one of the plurality of network devices as the current root bridge includes determining that the second one of the plurality of network devices is the current root bridge for the STP domain or the MSTP domain executing within the customer network,
    wherein the method further comprises, after selecting the second one of the plurality of network devices as the current root bridge, storing the bridge identifier associated with the second one of the plurality of network devices as a root bridge identifier, and
    wherein outputting the message from the first one of the plurality of network devices comprises outputting a MAC flush message to direct the remaining ones of the plurality of network devices to clear their respective L2 address information learned when forwarding the L2 communications, wherein the first one of the plurality of network devices formulates the MAC flush message to include the stored root bridge identifier.

4. The method of claim 3, further comprising generating the MAC flush message in accordance with a label distribution protocol (LDP) or a Multiple I-SID Registration Protocol (MIRP).

5. The method of claim 3, further comprising:
    after detecting the topology change, executing the STP or MSTP to select the first one of the plurality of network devices as the current root bridge for the STP domain or the MSTP domain executing within one of the plurality of sub-networks to which the first one of the plurality of network devices connects via one of the plurality of links but to which the second one of the plurality of network devices does not connect via one of the plurality of links given that the second one of the plurality of network devices is no longer included within the STP domain or the MSTP domain executing within the one of the plurality of sub-networks to which the first one of the plurality of network devices connects via one of the plurality of links;

determining whether the current root bridge identifier is the same as the previously stored root bridge identifier, wherein outputting the message comprises, in response to determination that the current root bridge identifier is not the same as the previously stored root bridge identifier, outputting the message from the first one of the plurality of network devices to direct the remaining ones of the plurality of network devices to clear their respective L2 address information learned when forwarding the L2 communications.

6. The method of claim 3, further comprising:

detecting a second topology change in the L2 customer network that rejoins the plurality of sub-networks to reform the L2 customer network;

executing the STP or the MSTP to once again select the second one of the plurality of network devices as the current root bridge for the STP domain or the MSTP domain executing in the L2 customer network; and outputting from the first one of the plurality network devices another message to direct the remaining ones of the plurality of network devices to clear their respective L2 address information learned when forwarding the L2 communications after detecting the topology change, wherein the first one of the plurality of network devices formulates this other message to include the bridge identifier determined by the loop-prevention protocol as the current root bridge prior to detecting the other topology change to direct the remaining ones of the plurality of network devices to clear only L2 addresses learned from the bridge identifier determined by the loop-prevention protocol as the current root bridge prior to the topology change that rejoins the plurality of sub-networks but after the topology change that split the L2 customer network into the plurality of networks.

7. The method of claim 1, further comprising:

blocking, with the first one of the plurality of network devices, one of the plurality of links by which the first one of the plurality of network devices couples to the L2 customer network; and in response to detecting the topology change, unblocking the one of the plurality of links by which the first one of the plurality of network devices couples to the L2 customer network so as to enable one of the plurality of sub-networks to which the first one of the plurality of network devices couples via the one of the plurality of links to access the intermediate network.

8. The method of claim 7, further comprising:

after enabling the first L2 computer sub-network to access the intermediate computer device, receiving L2 packets from end-user device located in the one of the plurality of sub-networks to which the first one of the plurality of network devices connects via the one of the plurality of links;

encapsulating the L2 packets so that the packets are capable of being transmitted via the intermediate network; and forwarding at least one of the encapsulated L2 packets to another L2 computer network via the intermediate network.

9. The method of claim 8, wherein encapsulating the L2 packets comprises encapsulating the L2 packets so that the packets are capable of being transmitted via a L2 connectivity provided in accordance with either one of a virtual private local area network (LAN) service (VPLS) or a provider backbone bridging (PBB) service.

10. The method of claim 1, wherein the intermediate network emulates a form of L2 connectivity provided in accordance with one of a virtual private local area network (LAN) service (VPLS) and a provider backbone bridging (PBB) service.

11. The method of claim 1, wherein the first one of the plurality of network devices and the second one of the plurality of network devices each comprises a provider edge device, and wherein the intermediate network comprises a service provider network.

12. The method of claim 1, wherein the first one of the plurality of network devices and the second one of the plurality of network devices each comprises a provider backbone bridging device, and wherein the intermediate network comprises a provider backbone bridging network.

13. A first network device of a plurality of network devices that provides multi-homed layer two (L2) connectivity between an L2 customer network and an intermediate network, the first network device comprising:

a control unit that executes a loop-prevention protocol, wherein each of the plurality of network devices is coupled to the L2 customer network by a different one of a plurality of links, and wherein the loop-prevention protocol determines a bridge identifier for each of the plurality of network devices, wherein the loop-prevention protocol selects, in accordance with the bridge identifiers, a second network device of the plurality of network devices as a current root bridge to forward L2 communications between the L2 customer network and the intermediate network without forwarding the L2 communications with other ones of the plurality of network devices and detects a topology change that splits the L2 customer network into a plurality of L2 sub-networks; and at least one interface that, in response to detecting the topology change, outputs a message to direct the remaining ones of the plurality of network devices to clear L2 address information learned when forwarding the L2 communications, wherein the message includes the bridge identifier determined by the loop-prevention protocol as the current root bridge prior to detecting the topology change to direct the remaining ones of the plurality of network devices to clear only L2 addresses learned from the bridge identifier determined by the loop-prevention protocol as the current root bridge.

14. The first network device of claim 13, wherein the control unit receives data configuring the loop-prevention protocol such that the first network device is configured to be a backup root bridge to the second network device with respect to the loop-prevention protocol, wherein the loop-prevention protocol detects a topology change that splits the L2 customer network into a first L2 sub-network network to which the first one of the plurality of network devices couples via a first one of the plurality of links and a second L2 sub-network to which the second one of the plurality of network devices couples via a second one of the plurality of links and, after detecting the topology change, selects the first network device as the current root bridge given that the second network device no longer participates in the loop-prevention protocol due to the topology change.

15. The first network device of claim 13,
wherein the loop-prevention protocol comprises a spanning tree protocol (STP) or a multiple spanning tree protocol (MSTP),
wherein the loop-prevention protocol determines that the second network device is the current root bridge for the STP domain or the MSTP domain executing within the customer network and, after selecting the second network device as the current root bridge, storing the bridge identifier associated with the second network device as a root bridge identifier, and
wherein the at least one interface outputs a MAC flush message to direct the remaining ones of the plurality of network devices to clear their respective L2 address information learned when forwarding the L2 communications, wherein the control unit formulates the MAC flush message to include the stored root bridge identifier.

16. The first network device of claim 15, wherein the control unit generates the MAC flush message in accordance with a label distribution protocol (LDP) or a Multiple I-SID Registration Protocol (MIRP).

17. The first network device of claim 15,
wherein the control unit, after detecting the topology change, executes the loop-prevention protocol to select the first network device as the current root bridge for the STP domain or the MSTP domain executing within one of the plurality of sub-networks to which the first network device connects via one of the plurality of links but to which the second network device does not connect via one of the plurality of links given that the second network device is no longer included within the STP domain or the MSTP domain executing within the one of the plurality of sub-networks to which the first device connects via one of the plurality of links;
wherein the loop-prevention protocol determines whether the current root bridge identifier is the same as the previously stored root bridge identifier,
wherein the at least one interface, in response to determination that the current root bridge identifier is not the same as the previously stored root bridge identifier, outputs the message to direct the remaining ones of the plurality of network devices to clear their respective L2 address information learned when forwarding the L2 communications.

18. The first network device of claim 15,
wherein the loop-prevention protocol detects a second topology change in the L2 customer network that rejoins the plurality of sub-networks to reform the L2 customer network and once again selects the second network device as the current root bridge for the STP domain or the MSTP domain executing in the L2 customer network; and
the at least one interface outputs another message to direct the remaining ones of the plurality of network devices to clear their respective L2 address information learned when forwarding the L2 communications after detecting the topology change, wherein the control unit formulates this other message to include the bridge identifier determined by the loop-prevention protocol as the current root bridge prior to detecting the other topology change to direct the remaining ones of the plurality of network devices to clear only L2 addresses learned from the bridge identifier determined by the loop-prevention protocol as the current root bridge prior to the topology change that rejoins the plurality of sub-networks but after the topology change that split the L2 customer network into the plurality of networks.

19. The first network device of claim 13, wherein the control unit blocks one of the plurality of links by which the first one of the plurality of network devices couples to the L2 customer network and, in response to detecting the topology change, unblocks the one of the plurality of links by which the first network device couples to the L2 customer network so as to enable one of the plurality of sub-networks to which the first network device couples via the one of the plurality of links to access the intermediate network.

20. The first network device of claim 19,
wherein the at least one interface, after enabling the first L2 computer sub-network to access the intermediate computer device, receives L2 packets from end-user device located in the one of the plurality of sub-networks to which the first network device connects via the one of the plurality of links,
wherein the control unit executes a module that encapsulates the L2 packets so that the packets are capable of being transmitted via the intermediate network, and
wherein the at least one interface further forwards the encapsulated L2 packets to another L2 computer network via the intermediate network.

21. The first network device of claim 20, wherein the module that encapsulates the L2 packets comprises a virtual private local area network service module or a provider backbone bridging service module that encapsulates the L2 packets so that the packets are capable of being transmitted via a L2 connectivity provided in accordance with either one of a virtual private local area network (LAN) service (VPLS) or a provider backbone bridging (PBB) service, respectively.

22. The first network device of claim 13, wherein the intermediate network emulates a form of L2 connectivity provided in accordance with one of a virtual private local area network (LAN) service (VPLS) and a provider backbone bridging (PBB) service.

23. The first network device of claim 13,
wherein the first network device and the second network device each comprises a provider edge device, and
wherein the intermediate network comprises a service provider network.

24. The first network device of claim 13,
wherein the first network device and the second network device each comprises a provider backbone bridging device, and
wherein the intermediate network comprises a provider backbone bridging network.

25. A non-transitory computer-readable medium comprising instructions that, when executed, cause one or more processors to:
execute a loop-prevention protocol on a first one of a plurality of network devices that provide multi-homed layer two (L2) connectivity between an L2 customer network and an intermediate network, wherein each of the plurality of network devices is coupled to the L2 customer network by a different one of a plurality of links, and wherein the loop-prevention protocol determines a bridge identifier for each of the plurality of network devices;
in accordance with the bridge identifiers, select with the loop-prevention protocol a second one of the plurality of network devices as a current root bridge to forward L2 communications between the L2 customer network and the intermediate network without forwarding the L2 communications with other ones of the plurality of network devices;

detect, with the first one of the plurality of network devices, a topology change that splits the L2 customer network into a plurality of L2 sub-networks; and in response to detecting the topology change, output a message from the first one of the plurality of network devices to direct the remaining ones of the plurality of network devices to clear L2 address information learned when forwarding the L2 communications, wherein the first one of the plurality of network devices formulates the message to include the bridge identifier determined by the loop-prevention protocol as the current root bridge prior to detecting the topology change to direct the remaining ones of the plurality of network devices to clear only L2 addresses learned from the bridge identifier determined by the loop-prevention protocol as the current root bridge.

26. A network system comprising:

a first L2 customer network that includes first and second customer edge (CE) devices;

a second L2 customer network that includes a third customer edge (CE) device; and a service provider network positioned intermediate to the first L2 customer network and the second L2 customer network and provides layer two (L2) connectivity in the form of a virtual private local area network (LAN) service (VPLS) between the first L2 customer network and the second L2 customer network to transparently, from the perspective of the first L2 customer network and the second L2 customer network, connect the first and second L2 customer networks to one another, wherein the service provider network includes:

a first provider edge (PE) device that couples to the first CE device via a first link;

a second PE device that couples to the second CE device via a second link; and a third PE device that couples to the third CE device via a third link, wherein the first PE device includes:

a control unit that executes a loop-prevention protocol, wherein the loop-prevention protocol determines a bridge identifier for each of the first and second PE devices, in accordance with the bridge identifiers, selects with the loop-prevention protocol the second PE device as a current root bridge to forward L2 communications between the first L2 customer network and the service provider network without forwarding the L2 communications with the first PE device, and detects a topology change that splits the first L2 customer network into a plurality of L2 sub-networks; and at least one interface that, in response to detecting the topology change, outputs a message to direct one or more of the second PE device and the third PE device to clear L2 address information learned when forwarding the L2 communications, wherein the message includes the bridge identifier determined by the loop-prevention protocol as the current root bridge prior to detecting the topology change to direct one or more of the second PE device and the third PE device to clear only L2 addresses learned from the bridge identifier determined by the loop-prevention protocol as the current root bridge.

27. A network system comprising:

a first L2 provider backbone (PB) network that includes first and second PB devices;

a second L2 PB network that includes a third and fourth PB devices; and a provider backbone bridging (PBB) network positioned intermediate to the first L2 PB network and the second L2 PB network and provides layer two (L2) connectivity in the form of a backbone virtual private local area network (LAN) (B-VLAN) between the first L2 PB network and the second L2 PB network to transparently, from the perspective of the first L2 PB network and the second L2 PB network, connect the first and second L2 PB networks to one another, wherein the PBB network includes:

a backbone edge bridging (BEB) device that couples to the first PB device via a first link;

a second BEB device that couples to the second PB device via a second link; and a third BEB device that couples to the third PB device via a third link, wherein the first BEB device includes:

a control unit that executes a loop-prevention protocol, wherein the loop-prevention protocol determines a bridge identifier for each of the first and second BEB devices, in accordance with the bridge identifiers, selects with the loop-prevention protocol the second BEB device as a current root bridge to forward L2 communications between the first L2 customer network and the service provider network without forwarding the L2 communications with the first BEB device, and detects a topology change that splits the first L2 customer network into a plurality of L2 sub-networks; and at least one interface that, in response to detecting the topology change, outputs a message to direct one or more of the second BEB device and the third BEB device to clear L2 address information learned when forwarding the L2 communications, wherein the message includes the bridge identifier determined by the loop-prevention protocol as the current root bridge prior to detecting the topology change to direct one or more of the second BEB device and the third BEB device to clear only L2 addresses learned from the bridge identifier determined by the loop-prevention protocol as the current root bridge.

28. A network system comprising:

a first L2 provider backbone (PB) network that includes first and second PB devices;

a second L2 PB network that includes a third and fourth PB devices;

a provider backbone bridging (PBB) network positioned intermediate to the first L2 PB network and the second L2 PB network and provides layer two (L2) connectivity in the form of a backbone virtual private local area network (LAN) (B-VLAN) between the first L2 PB network and the second L2 PB network to transparently, from the perspective of the first L2 PB network and the second L2 PB network, connect the first and second L2 PB networks to one another, wherein the PBB network includes:

a backbone edge bridging (BEB) device that couples to the first PB device via a first link;

a second BEB device that couples to the second PB device via a second link; and a third BEB device that couples to the third PB device via a third link, wherein the first BEB device includes:

a control unit that executes a loop-prevention protocol, wherein the loop-prevention protocol determines a bridge identifier for each of the first and second BEB devices and, in accordance with the bridge identifiers, selects with the loop-prevention protocol the second BEB device as a current root bridge to forward L2 communications between the first L2 PB network and the PBB network without forwarding the L2 communications with the first BEB device; and at least one interface that receives network traffic via the B-VLAN having a virtual L2 source address associated with the second BEB device and receives network traffic via the B-VLAN having a virtual L2 source address associated with the third BEB device, wherein the control unit stores data associating the virtual L2 source address associated with the third BEB device rather than store the virtual L2 source address associated with the second BEB device based on bridge identifier associated with the selected current root bridge so as not to improperly determine that the second BEB device is a remote peer.

* * * * *